United States Patent
Novak et al.

(10) Patent No.: US 8,934,456 B2
(45) Date of Patent: Jan. 13, 2015

(54) METHOD AND SYSTEM FOR CONNECTION ESTABLISHMENT BIAS FOR WIRELESS NETWORKS

(75) Inventors: Robert Novak, Stittsville (CA); Siva Dharshan Muruganathan, Stittsville (CA); William Anthony Gage, Stittsville (CA); Biswaroop Mukherjee, Stittsville (CA); Tank Tabet, Montreal (CA)

(73) Assignee: BlackBerry Limited, Waterloo, CA (US)

( * ) Notice: Subject to any disclaimer, the term of this patent is extended or adjusted under 35 U.S.C. 154(b) by 251 days.

(21) Appl. No.: 13/475,539

(22) Filed: May 18, 2012

(65) Prior Publication Data

US 2013/0308497 A1  Nov. 21, 2013

(51) Int. Cl.
| | |
|---|---|
| H04W 4/00 | (2009.01) |
| H04W 76/02 | (2009.01) |
| H04W 48/20 | (2009.01) |
| H04W 52/38 | (2009.01) |
| H04W 52/24 | (2009.01) |
| H04W 76/04 | (2009.01) |
| H04W 52/14 | (2009.01) |

(52) U.S. Cl.
 CPC ........... *H04W 76/02* (2013.01); *H04W 48/20* (2013.01); *H04W 52/38* (2013.01); *H04W 52/244* (2013.01); *H04W 76/046* (2013.01); *H04W 52/146* (2013.01)
 USPC ........................................ 370/332

(58) Field of Classification Search
 USPC ................................. 370/310–350
 See application file for complete search history.

(56) References Cited

U.S. PATENT DOCUMENTS

| | | | | |
|---|---|---|---|---|
| 2009/0137249 A1* | 5/2009 | Horn et al. | ............... | 455/435.2 |
| 2010/0046384 A1* | 2/2010 | Lee et al. | ............... | 370/252 |
| 2010/0297979 A1* | 11/2010 | Watfa et al. | ............... | 455/404.1 |
| 2012/0129536 A1* | 5/2012 | Zou et al. | ............... | 455/444 |
| 2012/0149362 A1* | 6/2012 | Tooher et al. | ............... | 455/423 |

FOREIGN PATENT DOCUMENTS

| | | |
|---|---|---|
| WO | 2010013055 A1 | 2/2010 |
| WO | 2010121635 A1 | 10/2010 |
| WO | 2012053240 A1 | 4/2012 |

OTHER PUBLICATIONS

3GPP R2-111701,"CR on ABS definition", Feb. 2011.
3GPP TS 36.300 v10.2.0,"Evolved Universal Terrestrial Radio Access (E-UTRA) and Evolved Universal Terrestrial Radio Access Network (E-UTRAN); Overall description ;Stage 2 (Release 10)" , Dec. 2010.
3GPP R2-113201, "Paging Reception in HetNet," ITRI, May 2011.

(Continued)

*Primary Examiner* — Kwang B Yao
*Assistant Examiner* — Juvena Loo
(74) *Attorney, Agent, or Firm* — Moffat & Co.

(57) ABSTRACT

A method at a user equipment, and the user equipment, configured for establishing a connected mode with a first network node within a wireless network, the method receiving, at the user equipment, a connection establishment bias; applying the connection establishment bias at the user equipment, while the user equipment is in an idle mode, to at least one network node power level value, thereby creating biased power level values; and connecting to the first network node based on the biased power level values.

30 Claims, 12 Drawing Sheets

(56) References Cited

OTHER PUBLICATIONS

3GPP R2-103560, "Enabling communication in harsh interference scenarios", Qualcomm, Jun. 2010.

3GPP R1-106060, "ABS patterns in Macro-Femto deployments", Pantech, Nov. 2010.

3GPP R1-106387, " on Macro-Femto interference handling", Ericsson, ST-Ericsson, Nov. 2011.

3GPP TS 36.304 V10.1.0, "Technical Specification 3rd Generation Partnership Project; Technical Specification Group Radio Access Network; Evolved Universal Terrestrial Radio Access (E-UTRA); User Equipment (UE) procedures in idle mode (Release 10)", Mar. 2011.

3GPP R2-114133, "Idle mode cell reselection considerations", New Postcom, Aug. 2011.

3GPP R2-113792,"Random Access Enhancement in eICIC", ZTE, Aug. 2011.

3GPP R2-114286,"Discussion on random access enhancement in time domain ICIC", Alcatel-Lucent Shanghai Bell, Alcatel-Lucent, Aug. 2011.

3GPP TS 36.331 v10.3.0,"Evolved Universal Terrestrial Radio Access (E-UTRA) and Evolved Universal Terrestrial Radio Access Network (E-UTRAN); Radio Resource control (RRC) protocol specification (Release 10)" , Sep. 2011.

Extended European Search Report on European Application No. 13163295.2, issued Sep. 25, 2013.

\* cited by examiner

METHOD AND SYSTEM FOR CONNECTION ESTABLISHMENT BIAS FOR WIRELESS NETWORKS

FIELD OF THE DISCLOSURE

The present disclosure relates to wireless networks and in one embodiment to heterogeneous cellular networks having an aggressor cell and a victim cell.

BACKGROUND

Various mobile architectures include a macro cell having smaller cells found within these macro cells. One example is a Long Term Evolution Advanced (LTE-A) communication standard in which a User Equipment (UE) may communicate with both the macro cell and small cells, such as pico cells, femto cells or relay cells. The use of LTE-A is however not limiting, and any other similar networks are possible.

In an LTE heterogeneous network, pico cells could be deployed with overlaid macro cells. The pico cells could share the same carrier with the macro cell or use different carriers. A network may offload traffic from an aggressor cell such as the macro cell to a victim cell having a weaker signal than the aggressor cell in order to free network resources.

If an aggressor cell is producing significant interference for a victim cell that is trying to send a system information message, referred to herein as a page, to the UE, it may be difficult or impossible for the UE to detect the page unless the page coincides with an almost blank subframe (ABS) of an aggressor cell. The UE, however, only listens for pages during a UE's paging occasion (PO) and thus the UE may be unable to receive a page unless the PO corresponds with the ABS of the aggressor cell. In some cases, this can be quite long or never. For example, when a victim UE is attached to a pico cell, the UE may be paged by the Evolved Node-B (eNB). In the presence of macro cell interference, particularly when the pico UE is operating in cell range expansion, the page may be missed. While the disclosure below discusses a pico/macro scenario, other cases where cell interference can lead to a weaker cell's pages being missed are also possible and the present solution is not limited to such a pico and macro scenario.

The terms "aggressor" and "victim" cell are used herein to describe cells having a stronger signal and a weaker signal, as viewed by a UE, respectively. In some cases, this may correspond to Release 10 LTE definitions, which describe cells in specific scenarios, regardless of signal strength, and imply that the aggressor may use ABS. For example, the macro cell is the aggressor cell in macro-pico scenario in LTE release 10. However, in other cases such as a macro-macro scenario, aggressor and victim cells are not defined by release 10 LTE. Thus, as used herein, the aggressor cell is defined as the cell from which the strongest downlink signal is received, and victim cell or cells are those with weaker received downlink signals at the time of camping selection. An aggressor cell and one or more victim cells can be identified for each UE where two or more cells exist. Further, signal strengths of the cells may change as viewed at a UE, and thus a victim cell may become an aggressor cell, and vice versa.

BRIEF DESCRIPTION OF THE DRAWINGS

The present disclosure will be better understood with reference to the drawings, in which.

DETAILED DESCRIPTION OF THE DRAWINGS

The present disclosure provides a method to establish a connected mode between a user equipment and a first network node within a wireless network, the method comprising: receiving, at the user equipment, a connection establishment bias; applying the connection establishment bias at the user equipment, while the user equipment is in an idle mode, to at least one network node power level value, thereby creating biased power level values; and connecting to the first network node based on the biased power level values.

The present disclosure further provides a user equipment configured for establishing a connected mode with a first network node within a heterogeneous network, the user equipment comprising: a processor; and a communications subsystem, wherein the processor and communications subsystem are configured to: receive a connection establishment bias; apply the connection establishment bias at the user equipment, while the user equipment is in an idle mode, to at least one network node power level value, thereby creating biased power level values; and connect to the first network node based on the biased power level values.

A heterogeneous network is designed to provide a balance of coverage needs and capacity. It may include macro cells and low-power nodes such as pico cells, femto cells, and relays, among others. The macro cells overlay the low-power nodes or small cells, sharing the same frequency or on different frequencies. In one embodiment, small cells are utilized to offload capacity from macro cells, improve indoor and cell edge performance, among other factors. For example, near a cell edge, a mobile device that connects to a pico cell may have better data throughput than when connecting to the macro cell.

In heterogeneous network deployment, inter-cell interference coordination (ICIC) plays an important role and time domain based resource sharing or coordination has been provided as an enhanced ICIC (eICIC). The eICIC is also known as the Almost Blank Subframe (ABS) based solutions. In such an ABS based solution, a dominant cell will transmit almost no information in a certain subframes.

There are two main deployment scenarios where eICIC is utilized. These include the closed subscriber group (femto cell) scenario and the pico cell scenario.

Figure 1:
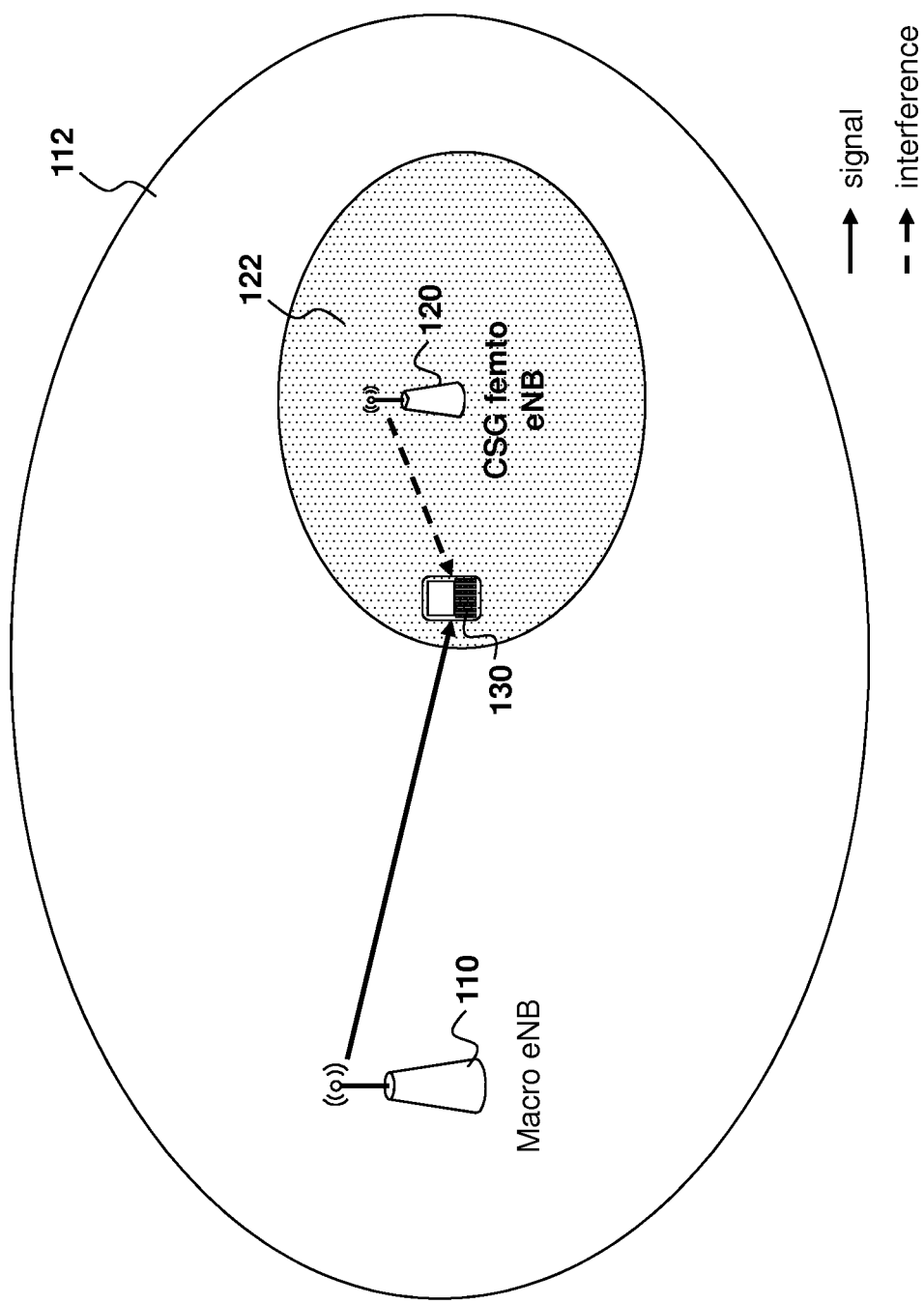
FIG. 1 is a block diagram illustrating a heterogeneous network having a closed subscriber group cell within a macro cell.

Reference is now made to FIG. 1, which shows the closed subscriber group scenario. In FIG. 1, macro evolved Node B (eNB) 110 has a cell coverage area shown by circle 112.

Similarly, closed subscriber group (CSG) cell 120 has a coverage area shown by circle 122.

A non-member UE 130 enters into the CSG coverage area 122. However, since UE 130 is not a member of CSG cell 120, UE 130 cannot connect to CSG cell 120 must continue to be served by macro cell 110. In this case, the CSG cell is dominant and has a stronger signal power than that of macro cell 110 and the signals from CSG cell 120 are seen as interference at UE 130.

That is, according to FIG. 1, dominant interference conditions may happen when non-member users are in close proximity of a CSG cell 120. Typically, the Physical Downlink Control Channel (PDCCH) reception at the non-member UE is interfered with by the downlink transmission from the CSG cell 120 to its member UEs. Interference to the PDCCH reception of the macro cell UE 130 has a detrimental impact on both the uplink and downlink data transfer between the UE and the macro eNB 110. In addition, other downlink control channels and reference signals from both the macro eNB 110 and neighbor cells that may be used for cell measurements and radio link monitoring are also interfered with by the downlink transmission from the CSG cell 120 to its member UEs.

Depending on network deployment and strategy, it may not be possible to divert the users suffering from inter-cell interference to another E-UTRA carrier or other radio access technology (RAT). In this case, time domain ICIC may be used to allow such non-member UEs to remain served by the macro cell on the same frequency layer. Such interference may be mitigated by the CSG cell utilizing Almost Blank Subframes (ABS) to protect the protected resources for radio resource measurement (RRM), radio link monitoring (RLM) and Channel State Information (CSI) measurements for the serving macro eNB 110, allowing the UE to continue to be served by the macro eNB under otherwise strong interference from the CSG cell.

Figure 2:
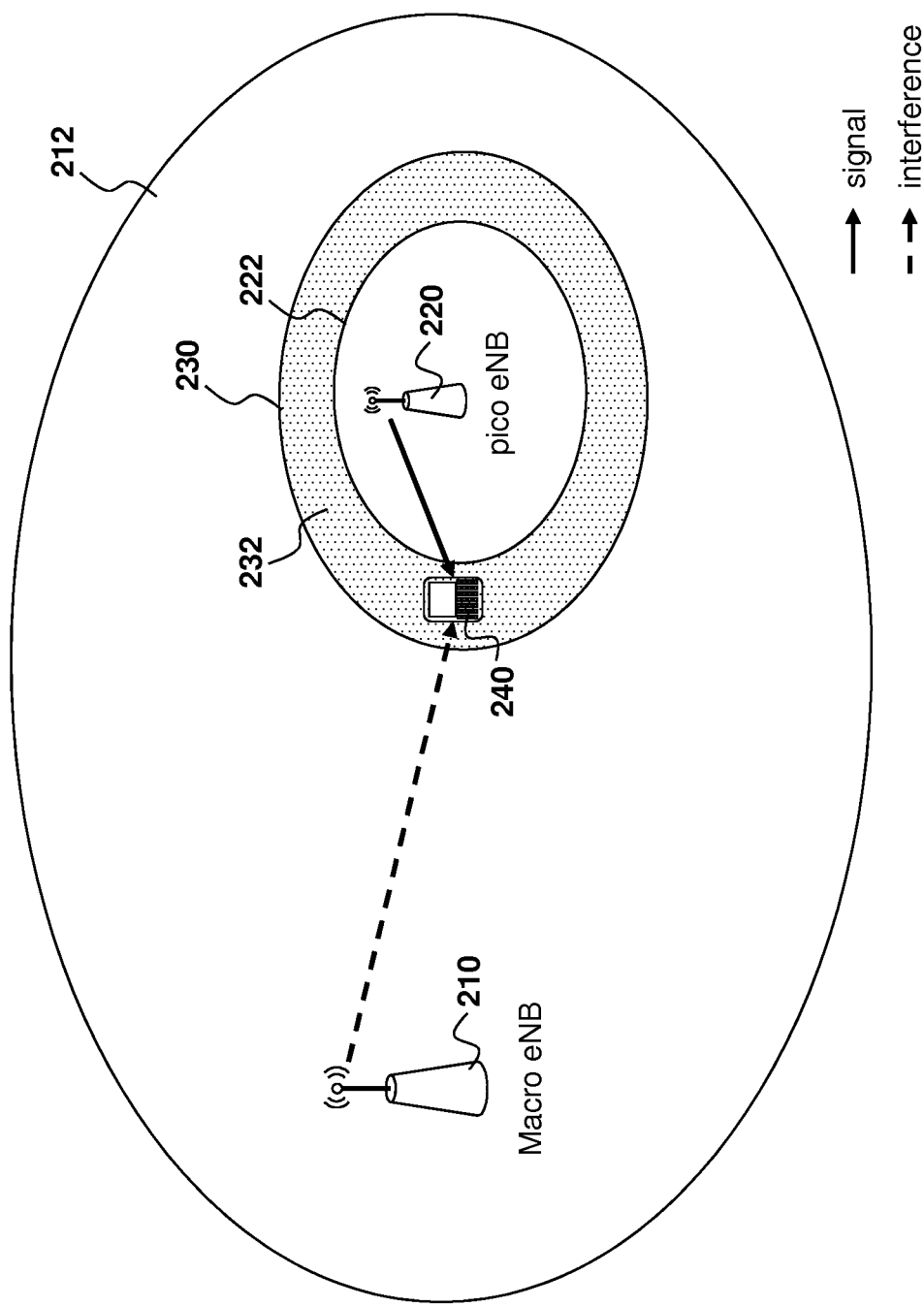
FIG. 2 is a block diagram illustrating a heterogeneous network having a pico cell within a macro cell.

Similarly, for a pico scenario, reference is made to FIG. 2. In FIG. 2, macro eNB 210 has a cell coverage area shown by circle 212. Similarly, a pico cell 220 has a coverage area shown by circle 222. Pico cell 220 may further include a range expansion area 232 used for increasing the coverage area for pico cell 220.

A UE 240 is served by pico cell 220, but it is close to the edge of the pico cell coverage or in range expansion area 232 of the pico cell 220. In this case, macro eNB 210 may generate/cause significant interference for the UE 240.

In particular, the time domain ICIC may be utilized for a pico cell 220, for users who are served in the edge of the serving pico cell. This scenario may be used, for example, for traffic offloading from a macro eNB 210 to the pico cell 220.

Typically, the Physical Downlink Control Channel transmitted by the pico cell is interfered by the downlink transmission from the macro cell. In addition, other downlink control channels and reference signals, from both the pico cell 220 and from neighbor pico cells, that may be used for cell measurements and radio link monitoring are also interfered with by the downlink transmission from the macro cell.

Time domain ICIC may be utilized to allow such UEs to remain served by the pico cell 220 at an extended range on the same frequency layer. Such interference may be mitigated by the macro cell using an ABS to protect the corresponding pico cell's subframes from the interference. A UE 240 served by a pico cell 220 uses the protected resources during the macro cell ABS for RRM, RLM and CSI measurements for the serving pico cell and possible for neighboring pico cells.

In both the FIG. 1 and FIG. 2 scenarios, for the ICIC, subframe utilization across different cells are coordinated in time through backhaul signaling or operations, administration and maintenance (OAM) to configuration of the Almost Blank Subframe patterns. The Almost Blank Subframes in an aggressor cell are used to protect resources in subframes in the victim cell receiving strong inter-cell interference from the aggressor cell.

Almost Blank Subframes are subframes with reduced transmit power and having no activity or reduced activity on some physical channels. However, in order to support backward compatibility for the legacy UEs, the eNB may still transmit some required physical channels in an ABS, including control channels and physical signals as well as System Information.

Figure 3:
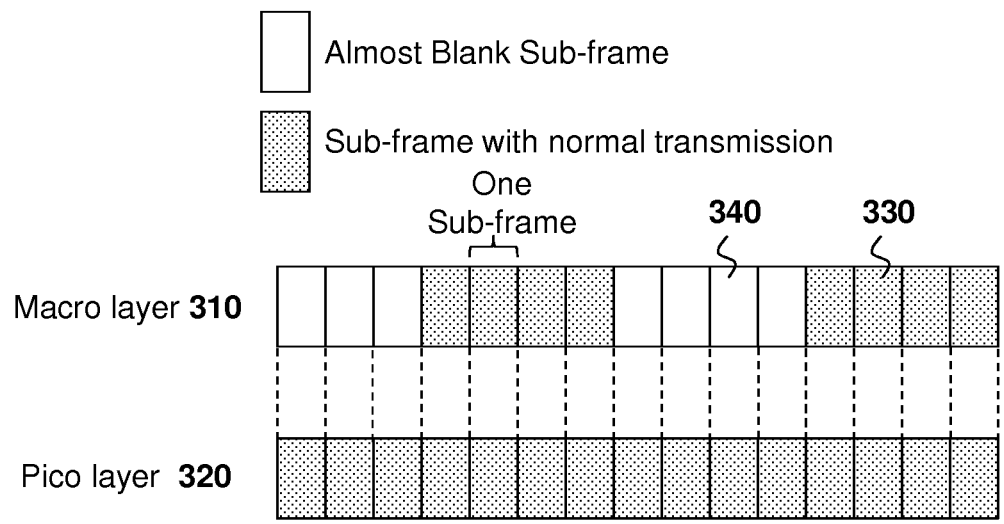
FIG. 3 is a block diagram showing subframe transmission at a macro layer and at a pico layer where the macro layer includes almost blank subframes.

An example of the ABS for pico scenario is shown with regards to FIG. 3. In FIG. 3, the macro layer 310 is the aggressor cell and pico layer 320 is the cell that has been interfered with. As seen in the example of FIG. 3, pico layer 320 transmits subframes with normal transmissions 330, as does macro layer 310. However, macro layer 310 also includes Almost Blank Subframes 340. Pico layer 320 may, when macro layer 310 is transmitting normal frames, schedule only UEs close to the pico cell during these subframes. However, during the Almost Blank Subframes transmissions, the pico layer 320 may transmit to UEs close to the cell edge or in the range expansion area.

Idle Mode Camping

While the above determines how to schedule a UE when the UE is actively connected to the pico cell, once the UE and network are finished with data transfer, the UE moves into an idle mode in which the UE periodically checks pages from the eNB on which it is camped to determine whether or not a connection needs to be re-established. Camping, as used herein, refers to an idle mode UE listening to system information messages from a particular network node. A UE will follow idle mode procedures described in 3GPP TS 36.304 v10.1.0, "Technical Specification $3^{rd}$ Generation Partnership Project; Technical Specification Group Radio Access Network; Evolved Universal Terrestrial Radio Access (E-UTRA); User Equipment (UE) Procedures In Idle Mode (Release 10)", March 2011, the contents of which are incorporated herein by reference. These idle mode procedures are used to determine on which cell the UE should camp.

When camped on a cell, the UE may listen for broadcast information contained in a master information block (MIB) and at least the system information blocks 1 and 2 (SIB1/SIB2), as well as other SIBs.

For example, in the 3G PP TS 36.331, v10.3.0, "Evolved Universal Terrestrial Radio Access (E-UTRA) and Evolved Universal Terrestrial Radio Access Network (E-UTRAN);

Radio Resource Control (RRC), Protocol Specification (Release 10)", September 2011, Section 5.2.2.3 specifies:

---

The UE shall:
    1> ensure having a valid version, as defined below, of (at least) the following system information, also referred to as the 'required' system information:
        2> if in RRC_IDLE:
            3> the MasterInformationBlock and SystemInformationBlockType1 as well as SystemInformationBlockType2 through SystemInformationBlockType8, depending on support of the concerned RATs;

---

The above MIB and SIB blocks provide the UE with appropriate information to receive pages from the cell, to initiate a RRC connection establishment in the event that the cell pages the UE, or in the event that the UE initiates the procedure itself, and information regarding neighbor cells for cell reselection. In general, the RRC connection establishment is performed by the UE to move from idle mode to connected mode.

During cell selection, the UE measures the signal strength from surrounding cells in order to determine the best cell for camping. The UE applies priorities based on service provider and other restrictions and within a priority, will rank cells according to received strength.

A bias or offset may be applied to measurements at the UE, and is termed herein $Q_{offset}$, and allows camping on a cell that is different from the one which has the strongest signal as received by the UE.

For example, one procedure for cell reselection ranking is given in the 3GPP TS 36.304, v10.1.0 specification, at Section 5.2.4.6, which relates to intra-frequency and equal priority inter-frequency Cell Reselection criteria. The section is reproduced in Table 1 below:

TABLE 1

3GPP TS 36.304, v10.1.0, Section 5.2.4.6

The cell-ranking criterion $R_s$ for serving cell and $R_n$ for neighbouring cells is defined by:
$R_s = Q_{meas, s} + Q_{Hyst}$
$R_n = Q_{meas, n} - Q_{offset}$
where:
| | |
|---|---|
| $Q_{meas}$ | RSRP measurement quantity used in cell reselections. |
| Qoffset | For intra-frequency: Equals to $Qoffset_{s, n}$, if $Qoffset_{s, n}$ is valid, otherwise this equals to zero. |
| | For inter-frequency: Equals to $Qoffset_{s, n}$ plus $Qoffset_{frequency}$, if $Qoffset_{s, n}$ is valid, otherwise this equals to $Qoffset_{frequency}$. |

The UE shall perform ranking of all cells that fulfil the cell selection criterion S, which is defined in 5.2.3.2, but may exclude all CSG cells that are known by the UE to be not allowed.
The cells shall be ranked according to the R criteria specified above, deriving $Q_{meas, n}$ and $Q_{meas, s}$ and calculating the R values using averaged RSRP results.
If a cell is ranked as the best cell the UE shall perform cell reselection to that cell. If this cell is found to be not-suitable, the UE shall behave according to subclause 5.2.4.4.
In all cases, the UE shall reselect the new cell, only if the following conditions are met:
the new cell is better ranked than the serving cell during a time interval $Treselection_{RAT}$;
more than 1 second has elapsed since the UE camped on the current serving cell.

---

As provided in Table 1 above, when UEs are not actively communicating with eNBs they enter idle mode. In idle mode, a UE wakes up for a particular paging occasion (PO), which may have intervals at several subframes. For example, in Long Term Evolution Release 10 frequency division duplexing (FDD), the paging occasions for cells are a subset of subframes #4, #5, #9 and #0, and are given as {#9}, {#4#9}, and {#4, #5, #0, #9}.

In LTE, a page is provided on the physical downlink control channel (PDCCH) with a paging radio network temporary identifier (P-RNTI), which points to a paging control channel (PCCH) message sent on the physical downlink shared channel (PDSCH) that contains identities of the UEs that are being paged. The UE may initiate a random access channel (RACH) procedure after successfully receiving the page to obtain uplink timing, a cell radio network temporary identifier (C-RNTI) and an uplink grant.

Figure 4:
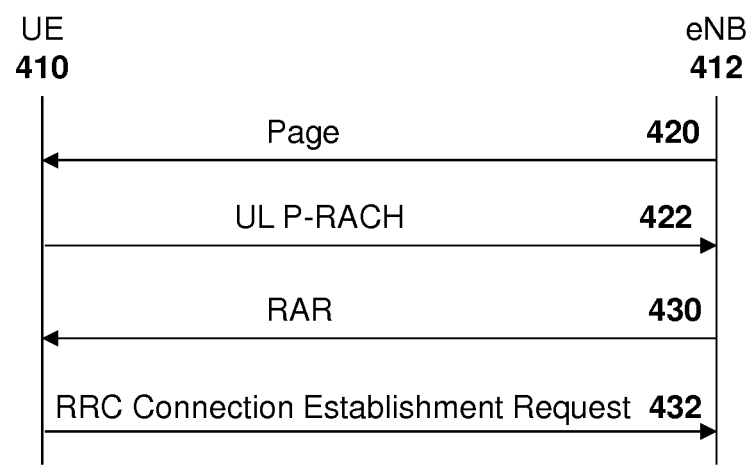
FIG. 4 is a data flow diagram showing random access channel procedures between a UE and evolved node B.

For example, reference is now made to FIG. 4, which shows the basic steps for establishment of a RRC connection. In particular, the UE 410 receives a page from eNB 412, shown as message 420.

In response, the UE sends an uplink P-RACH, as shown by message 422.

The eNB 412 receives the uplink P-RACH and in response sends a random access response (RAR) to the UE 410, as shown by message 430. The RAR in message 430 may contain a temporary C-RNTI, timing alignment information, and an initial uplink grant.

UE 410 then sends an uplink transmission on the physical uplink shared channel uplink (PUSCH), containing at least a RRC connection establishment request, as shown by message 432 in FIG. 4.

In cases of ABS configurations and dominant interferers, a victim UE in an idle mode may have difficulty receiving a page, such as the page in message 420, during non-ABS subframes of the aggressor cell. Interference cancellation (IC) may be used to at least partially mitigate such interference. However, IC may not be supported in all cases by all UEs. Further, while the ABS may occur more frequently, the interval between adjacent POs may be considerably longer and it is possible that the coincidence of the PO and the ABS pattern may be highly infrequent or even non-existent.

Thus, in some scenarios the PO subframes {#4, #5, #0, #9} may not coincide at all with the designated ABS or may infrequently coincide with the designated ABS, so there is little or no opportunity for a page by the victim cell that is free from interference from the aggressor cell. A missed page in this case can occur due to the failure to receive or decode the PDCCH configured by the P-RNTI, or a failure to receive or decode the PDSCH configured by the P-RNTI.

One option is to have the UE camp on the strongest cell. However, in a heterogeneous environment where the macro cell is overloaded, when the UE is paged or otherwise initiates RRC connection mode establishment procedures, the UE will then attempt this connection with the potentially overloaded macro cell. Once a connection is established, the connection may be offloaded to a pico cell or small cell later. Thus, the RRC connection establishment by the UE and subsequent offload process creates additional signaling load to an already overloaded macro cell.

As discussed above, the examples presented herein provide a macro cell and a pico cell environment. However, this environment is not limited and other situations where the aggressor cell may cause interference to paging for a UE camped on weaker cell may include, but are not limited to, where a pico UE is being paged by a pico eNB in the presence of an interfering macro eNB; a macro UE is paged by the macro eNB in the presence of an interfering closed subscriber group femto cell; a macro UE being paged by its macro eNB in the presence of a second interfering macro cell; a femto UE being paged by its femto-eNB in the presence of a second interference femto cell; a pico UE being paged by its pico eNB and the presence of an interfering femto cell; a femto UE being paged by its close subscriber group femto cell in the presence of an interfering macro or pico cell; among other possibilities. Thus, the present disclosure provides for the camping and receipt of pages from a first cell while providing the ability to perform RRC connection establishment with a second cell.

Further, the UE may also be in cell range expansion, meaning that the UE is in connected mode but is connected to a cell that is different from the cell providing the strongest downlink signal. Cell range expansion is defined the connect mode in Release 10 LTE systems, but a similar scenario may occur in idle mode. A Bias for cell reselection and camping, Qoffset, may be applied, or another mechanism may be used, such that a UE is in the equivalent of "cell range expansion" in idle mode as the UE is camped to a cell that is different from the cell providing the strongest downlink signal This creates a problem in receiving pages or further transmissions from the cell that the UE is camped on.

In addition, due to design or connection limitations one or more cells in the system may not provide a paging function. For example, a UE may be near an aggressor femto cell (CSG or otherwise) which does not have the paging function, or otherwise is not desirable on which to be camped in idle mode. This creates a problem in receiving pages or further transmissions from the femto cell. However, if the UE camps on the macro cell in this scenario, the UE will connect to the macro cell and hence, the RRC connection establishment by the UE and subsequent offload process creates additional signaling load to an already overloaded macro cell. Note that this is not limited to the femto-macro scenario, and can also include a UE in proximity of any CSG cell for which the UE is a member of the SG, a UE in the proximity of any cell from which paging or camping is not desirable, but to which RRC connection is desirable, and the presence of another cell which may be used for paging and/or camping.

In accordance with the above, the present disclosure provides UE idle mode procedures and RRC connection establishment in heterogeneous network environments. The present disclosure provides for a UE determining a bias from broadcast information from either a victim and/or aggressor eNB (i.e. weaker and/or stronger cell from the UE perspective) for the purpose of cell selection for camping in idle mode. In accordance with one embodiment, the UE may reselect a different eNB using an additional bias for the purpose of RACH procedures after receiving a page. Thus, a second bias value, herein called a "RRC connection establishment bias" or "r-Bias", can lead to the starting of a RACH procedure with an eNB that is different than the one the UE was camped on.

Thus, in the pico-macro case, camping on the macro cell ensures the reception of page messages, while reselection procedures using the RRC connection establishment bias as described herein are applied regardless of the reason for the UE initiating the RRC connection from an RRC idle mode. Such reasons can include, for example, paging, UE originating calls, among other factors.

Thus, in accordance with the present disclosure, a UE determines an appropriate cell for camping in idle mode and then uses the r-Bias in order to reselect a cell prior to initiating the RACH procedure. The use of the r-Bias allows the UE to be camped on one eNB in order to receive pages and select a different eNB for the purpose of RRC connection establishment. The UE may be connected to a victim cell, go to idle and camp on an aggressor cell for paging receptions, thus avoiding paging interference, and then reconnect to the victim cell when paged if channel conditions are appropriate, for example.

R-Bias from Victim Cell

Figure 5:
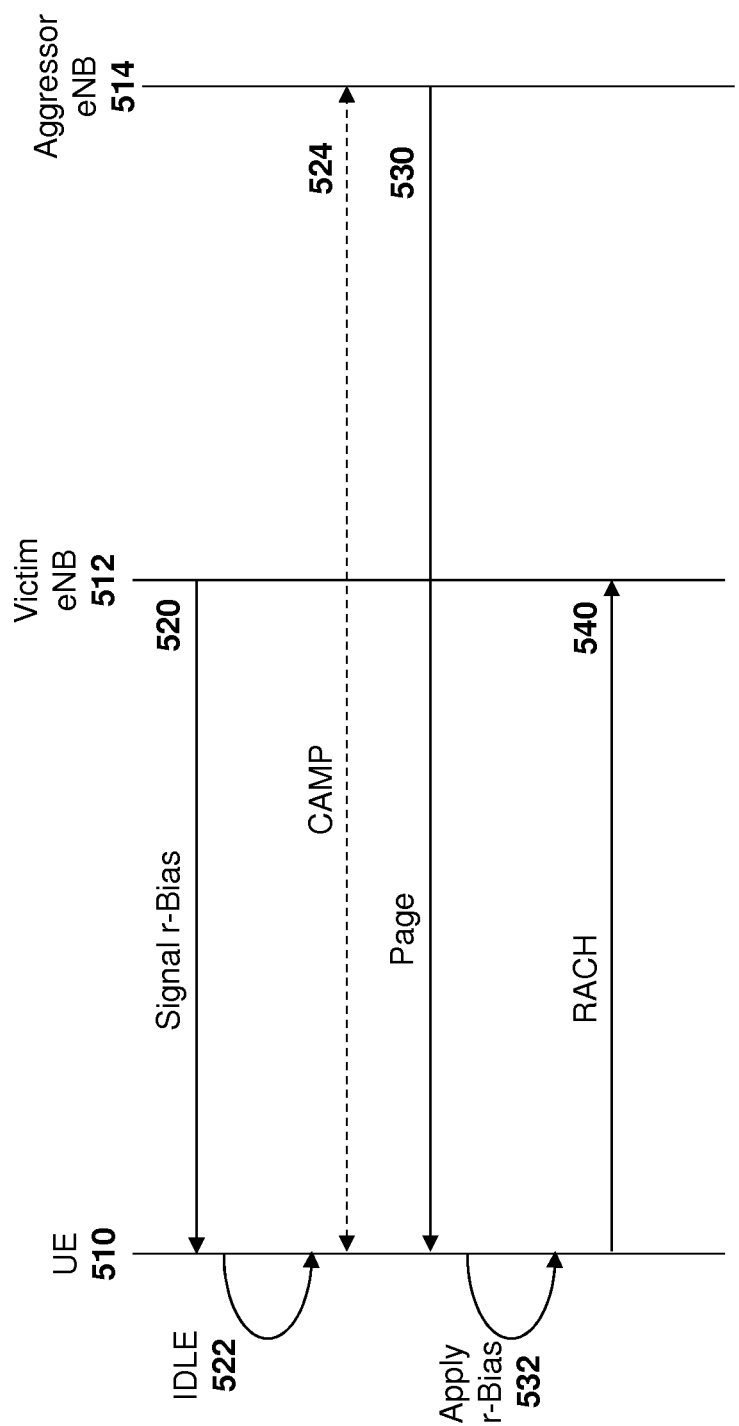
FIG. 5 is a data flow diagram showing the camping of a UE on an aggressor cell and reestablishing a connection with a victim cell using an r-Bias value obtained from the victim cell.

Reference is now made to FIG. 5. In the example of FIG. 5, a UE 510 is initially connected to a victim cell, and then goes to idle mode in the presence of strong aggressor interference.

In particular, UE 510 communicates with a victim eNB 512. Further an aggressor eNB 514 has a stronger signal strength than victim eNB 512 as seen at UE 510.

The victim eNB 512 may signal an R-Bias to the UE, as shown by arrow 520. This is typically done when the UE 510 is in a connected mode with the victim cell and the information may, for example, be contained in broadcast information such as the system information block 2 (SIB2) or may be indicated when one or more UEs enter idle mode, among other possibilities. The UE may retain the r-bias information after entering idle mode.

UE 510 enters idle mode, as shown by arrow 522. When entering idle mode, UE 510 must decide on which eNB to camp. In the example of FIG. 5, aggressor eNB 514 has a stronger signal than eNB 512, as seen at UE 510, and based on this the UE chooses to camp on aggressor eNB 514, as shown by arrow 524. In accordance with one embodiment, no RRC connection establishment bias is applied in the decision on which cell to camp while in idle mode.

Subsequently, traffic arrives for UE 510 and aggressor eNB 514 sends a page to UE 510, as shown by arrow 530. In alternative embodiments UE 510 has traffic that needs to be sent over the network and the page 530 may be skipped in the process of FIG. 5.

When an RRC connection needs to be established, either based on the page of arrow 530 or based on the UE 510 having traffic to send, UE 510 then applies the previously received R-Bias value to the signal strengths of the victim eNB and the aggressor eNB. In the example of FIG. 5, the UE 510 is still close to the victim eNB 514 and thus, when the R-Bias is applied, as shown by arrow 532, the victim eNB 512 has a cell power greater than the value of the aggressor cell power. The UE 510 therefore chooses victim eNB 512 and starts the random access channel procedures, as shown by arrow 540, with victim eNB 512.

Therefore, in accordance with the above, the UE may camp on a first eNB and then separately reconnect to a second eNB.

In one embodiment, the RRC connection establishment bias (R-Bias) can be included in the RadioResourceConfig-Common information element, which is included in the SIB2 message and shown in Appendix A attached hereto. From Appendix A, the RadioResourceConfigCommon information element includes an R-Bias value in the RadioResourceConfigCommon sequence and the R-Bias value is an integer from a negative maximum value to a positive maximum value.

Further, reference is made to Appendix B, which shows the RadioResourceConfigCommon field descriptions, in which an R-Bias description has been added. In the R-Bias description of Appendix B, the R-Bias is indicated to be applied to power measurements of the cell during cell reselection. If absent, the UE applies a zero bias.

In further embodiments, the UE does not necessarily need to be connected to the victim cell initially. For example, the UE in idle mode may enter an area and determine the RRC connection establishment bias from broadcast information of the victim cell. The UE may then follow the same procedures above with regard to camping on the aggressor cell and selecting the victim cell for connection. Thus, from FIG. 5, arrow 520 may be a broadcast message from the victim eNB to all UEs, including those in idle mode. In this case, the move to idle mode, shown by arrow 522, would occur before the receipt of the message at arrow 520.

In one embodiment a victim cell may also broadcast an indication of whether all UEs should apply the bias, or only those that were previously connected to the victim cell. This could be done, for example, by providing an indication of bias to specific UEs. For example, UEs that are in the cell range expansion may need to apply a bias.

Further, a broadcast of bias may be made but an indication to use bias only in certain circumstances provided. For example, all UEs entering idle mode in a cell range expansion may apply the bias. Alternatively, such broadcast could be made for all UEs that were in connected mode with the victim cell prior to entering idle mode.

In a third alternative, the victim cell may broadcast the bias, but also provide system configurations or specifications indicating that only a select group of UEs are to apply the bias that is broadcast.

R-Bias from Aggressor Cell

In an alternative embodiment, the RRC connection establishment bias is indicated in broadcast information of the aggressor cell. This may be useful, for example, if the aggressor cell is a heavily loaded macro cell trying to direct new RRC connections to victim pico cells. The level of the r-Bias value controls the number of UEs that will select or reselect the victim cell during RRC connection establishment.

Figure 6:
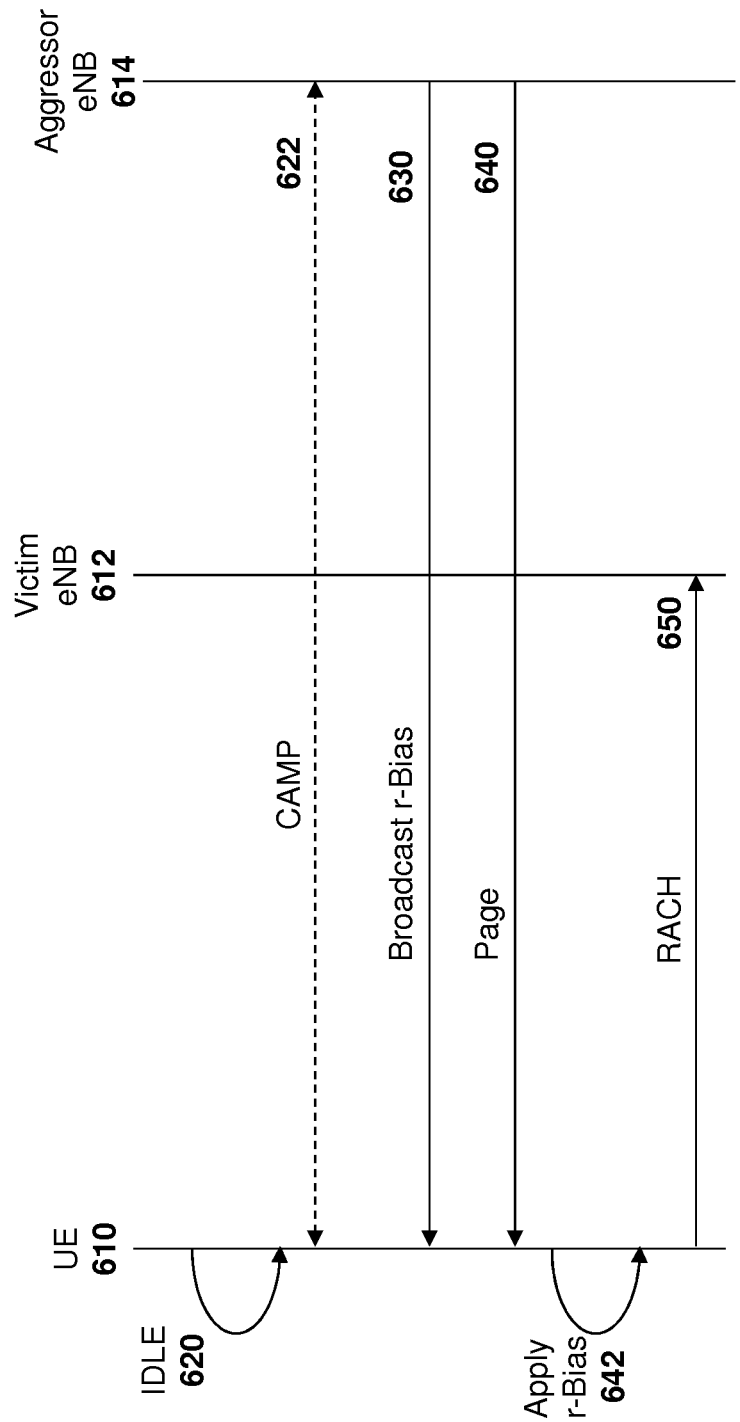
FIG. 6 is a data flow diagram showing the camping of a UE on an aggressor cell and reestablishing a connection with a victim cell using an r-Bias value obtained from the aggressor cell.

Reference is now made to FIG. 6. In FIG. 6, UE 610 communicates with a victim eNB 612 and an aggressor eNB 614.

UE 610 goes into idle mode, as shown by arrow 620 and then decides which cell to camp on. In this case, the aggressor eNB 614 has a stronger signal than victim eNB 612, as seen at UE 610, and therefore UE 610 chooses to camp on aggressor eNB 614, as shown by arrow 622.

UE 610 then monitors broadcasts from aggressor eNB 614 and receives a broadcast which has r-Bias value or values, as seen by arrow 630. The r-Bias value sent at arrow 630 could be an r-Bias value to be applied to all victim cells or could include a bias for only a specific victim cell. The broadcast of the bias may occur, for example, as part of system information block 4 (SIB4).

Subsequently, aggressor eNB 614 has traffic for UE 610 and sends a page, as shown by arrow 640.

UE 610 receives the page or, in other scenarios, has traffic that needs to be sent to the network, and thus initiates the RACH procedures without a page. In either case, UE 610 uses the r-Bias to select a cell to connect to, as shown by arrow 642. The UE 610 then uses the cell which is selected at arrow 642 in order to initiate the RACH procedure, as shown by arrow 650.

Arrow 642 uses the r-Bias to bias the power that is seen from the victim cell and from the aggressor and can therefore chose the stronger power after the bias has been applied. As will be appreciated, the example of FIG. 6 only contains two cells but, in practice, a plurality of cells could be seen by UE 610 and the r-Bias value could be applied to multiple cells or individual r-Bias values could be applied to the individual cells in order to determine which cell to connect to.

As indicated above with reference to broadcast message 630, one option for indicating the r-Bias values could be in an SIB4 message. Reference is now made to Appendix C, which shows an exemplary SIB4 information element. As seen in Appendix C, an r-Bias value is added to IntraFreqNeighCellInfo.

Further, an IntraFreqBlackCellList may include an r-Bias which is set to a value from a negative maximum bias to a positive maximum bias.

The SIB4 information element in Appendix C is applied on a per cell r-Bias basis. Thus, each cell is given its own r-Bias.

Referring to Appendix D, the definition for the r-Bias for the SIB4 information element is provided. As seen in Appendix D, the r-Bias is defined to be applied to the power measurements in the neighbor cells during cell reselection and, if absent, the UE applies a zero bias.

Alternatively, a single r-Bias value may be provided in an SIB4 message. Reference is now made to Appendix E. As seen in Appendix E, the SystemInformationBlockType4 includes an r-Bias value. Further, the IntraFreqBlackCellList has an r-Bias value that is defined to be between a negative maximum value and a positive maximum value.

Referring to Appendix F, the definition for the fields for the SystemInformationBlockType4 is provided, in which the r-Bias is added. The r-Bias definition includes the fact that the r-Bias is to be applied to power measurements of neighbor cells during reselection and, if absent, the UE should apply a zero bias.

Camping on Alternate eNB for Page Reception

The above examples are provided with regard to a pico-macro scenario. In other embodiments, a UE may wish to camp on a first cell but connect to a second cell. The first cell may or may not have a stronger signal, as seen by the UE, when compared to the second cell. Various reasons for such decisions exist.

For example, a femto eNB may not have the ability to page UEs in its vicinity, and hence it is not desirable for UE to remain camped in idle mode on the femto eNB. In addition, there may be other reasons including cell coverage, services, or reliability, that make it not desirable for UE to remain camped in idle mode on the femto eNB. In one example, it may be desirable to configure Qoffset bias and r-bias such that the UE camps on an alternate cell, such as a macro cell, and when compelled to do so, initiates RRC connection to the femto cell. It can be noted that in this embodiment, the UE camps on the victim cell, and sometime later, applies r-bias and initiates RRC connection establishment with the aggressor cell.

In these cases the UE may select an alternate eNB for camping, such as a macro eNB. This selection may occur as the either the macro cell is the stronger received signal, or alternatively, the macro cell is selected after applying a Qoffset bias to the power measurement which results in ranking the macro cell above the femto cell for reselection in idle mode.

According to the embodiments described herein, the UE may obtain r-bias value or values from the monitoring the broadcasts (e.g. SIBs) of the macro eNB, by monitoring broadcasts of the femto eNB, or the r-bias value may be obtained via broadcast or other signaling while the UE was previously connected to the femto eNB. In one example, the UE in idle mode reads the system information broadcast of the femto cell and determines (either from the system information or otherwise) that the femto cell is not suitable for camping on; however, the UE retains the r-bias value obtained from the femto cell SIBs. When compelled to enter connected mode, the UE may apply the r-bias value to the femto cell measurement.

Figure 7:
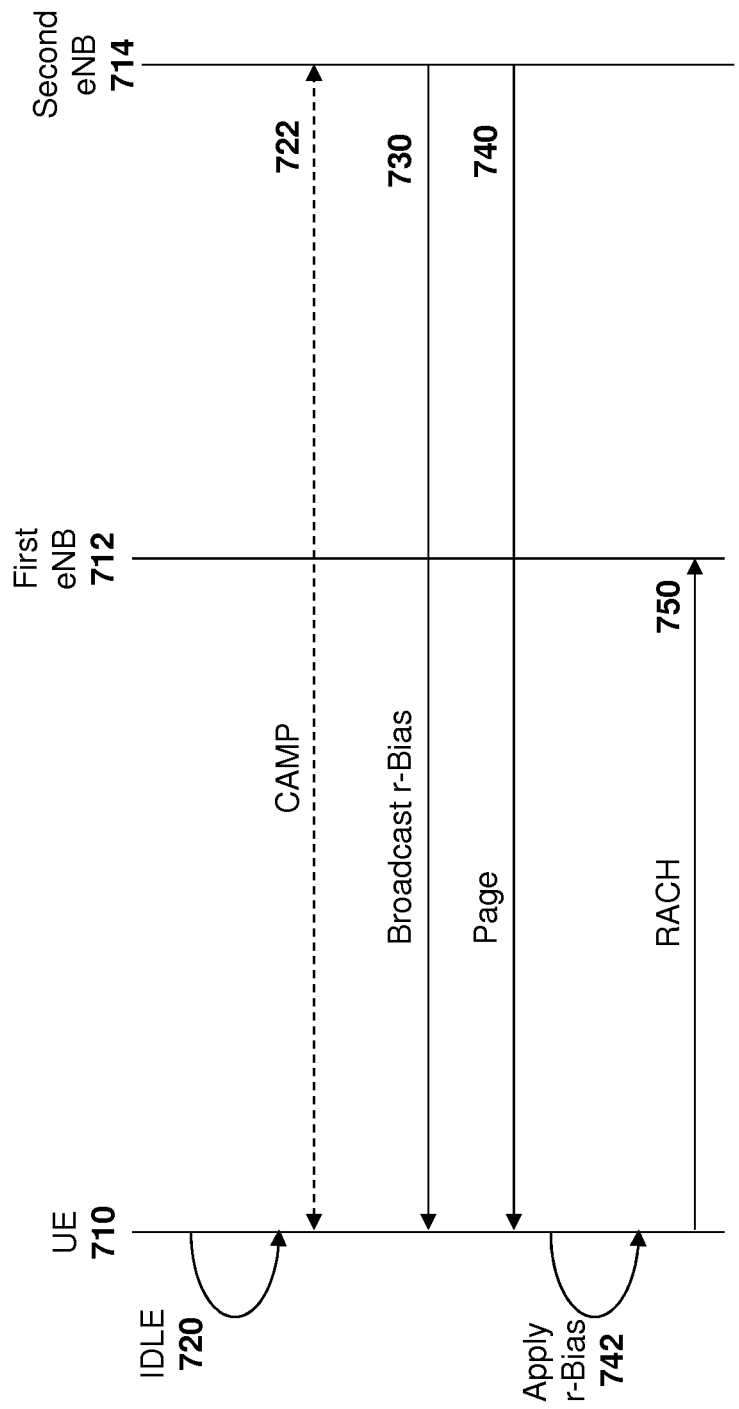
FIG. 7 is a data flow diagram showing the camping of a UE on an second cell and reestablishing a connection with a first cell using an r-Bias value obtained from the aggressor cell.

Reference is now made to FIG. 7, which shows the generic case of the UE 712 establishing an RRC connection with a first eNB 721 but camping on a second eNB 714.

Specifically, as shown in FIG. 7, UE 710 moves to an idle mode, as shown by arrow 720 and subsequently camps on second eNB 714, as shown by arrow 722.

In one embodiment, second eNB 714 may broadcast the r-Bias, as shown by arrow 730. However, as indicated above, the r-Bias may also be obtained from other cells or when the UE 710 moves to ide.

Subsequently, second eNB has traffic for UE 710 and sends a page, as shown by arrow 740.

UE 710 receives the page or, in other scenarios, has traffic that needs to be sent to the network, and thus initiates the RACH procedures without a page. In either case, UE 710 uses the r-Bias to select a cell to connect to, as shown by arrow 742. The UE 710 then uses the first cell, which is selected at arrow 742, in order to initiate the RACH procedure, as shown by arrow 750.

The UE, at arrow 742, uses the r-Bias to bias the power that is seen from the first cell and from the second cell, and the UE and can therefore chose the stronger power after the bias has been applied. As will be appreciated, the example of FIG. 7 only contains two cells but, in practice, a plurality of cells could be seen by UE 710 and the r-Bias value could be applied to multiple cells or individual r-Bias values could be applied to the individual cells in order to determine which cell to connect to.

Idle Mode and RRC Connection Establishment Procedures to Support RRC Connection Establishment Bias In order to support the use of the RRC connection establishment bias, procedures may include instructions to the UE to apply the bias when starting the RRC connection establishment. To support this functionality, various standards and specifications may be amended. Reference is made to Table 2 below, which shows an addition to 3GPP TS 36.304, and in particular, a new Section 5.3.X.

TABLE 2

3GPP TS 36.304 addition
5.3.X RRC connection establishment bias

Information on RRC connection establishment restrictions associated with the RRC connection establishment bias is broadcast as system information, [3].
The UE shall ignore RRC connection establishment bias related RRC connection establishment restrictions when selecting a cell to camp on, i.e. it shall not reject a cell for camping on because RRC connection establishment on that cell is biased such that RRC connection establishment should occur on a different cell. A change of the indicated RRC connection establishment bias shall not trigger cell reselection by the UE. RRC connection establishment bias related RRC connection establishment restrictions shall be checked by the UE when starting RRC connection establishment procedure as specified in [3].

As seen from Table 2 above, the addition indicates that the UE should ignore the RRC connection establishment bias when selecting a cell to camp on. Further, a change of the indicated RRC connection establishment bias should not trigger cell reselection by the UE. However, the RRC connection establishment bias related to the RRC connection establishment restrictions should be checked by the UE when starting the RRC connection establishment procedure.

Further, the RRC connection establishment procedures can include the checking of the bias prior to the sending of an RRC connection message to the cell. This may be implemented by the UE recording the cell for RRC connect at the time of cell reselection. The UE may check this recorded cell prior to initiating the RRC establishment procedure.

For example, in LTE Release 10 systems, the UE may be configured to calculate and record the ranking for RRC establishment, $R_R$, in addition to the already defined ranking for serving and neighbors, as indicated in the 3GPP TS36.304 for cell resection. Idle mode procedures for cell reselection are given in Appendix G, which shows an addition to the 3GPP TS36.304 specification with a Section 5.2.4.X and provides an intra-frequency and equal priority inter-frequency cell reselection criteria with cell reselection bias.

As indicated in Appendix G, a new measurement $R_R$ is equal to the power measurement minus the r-Bias. R-Bias is defined as the RRC connection establishment bias and equals r-Bias$_{s,n}$ and if r-Bias$_{s,n}$ and is valid and otherwise equals zero.

In an alternate formulation, a new measurement $R_R$ is equal to the neighbor measurement $R_n$ minus the r-Bias, thus including the Qoffset parameter in the ranking.

Figure 8:
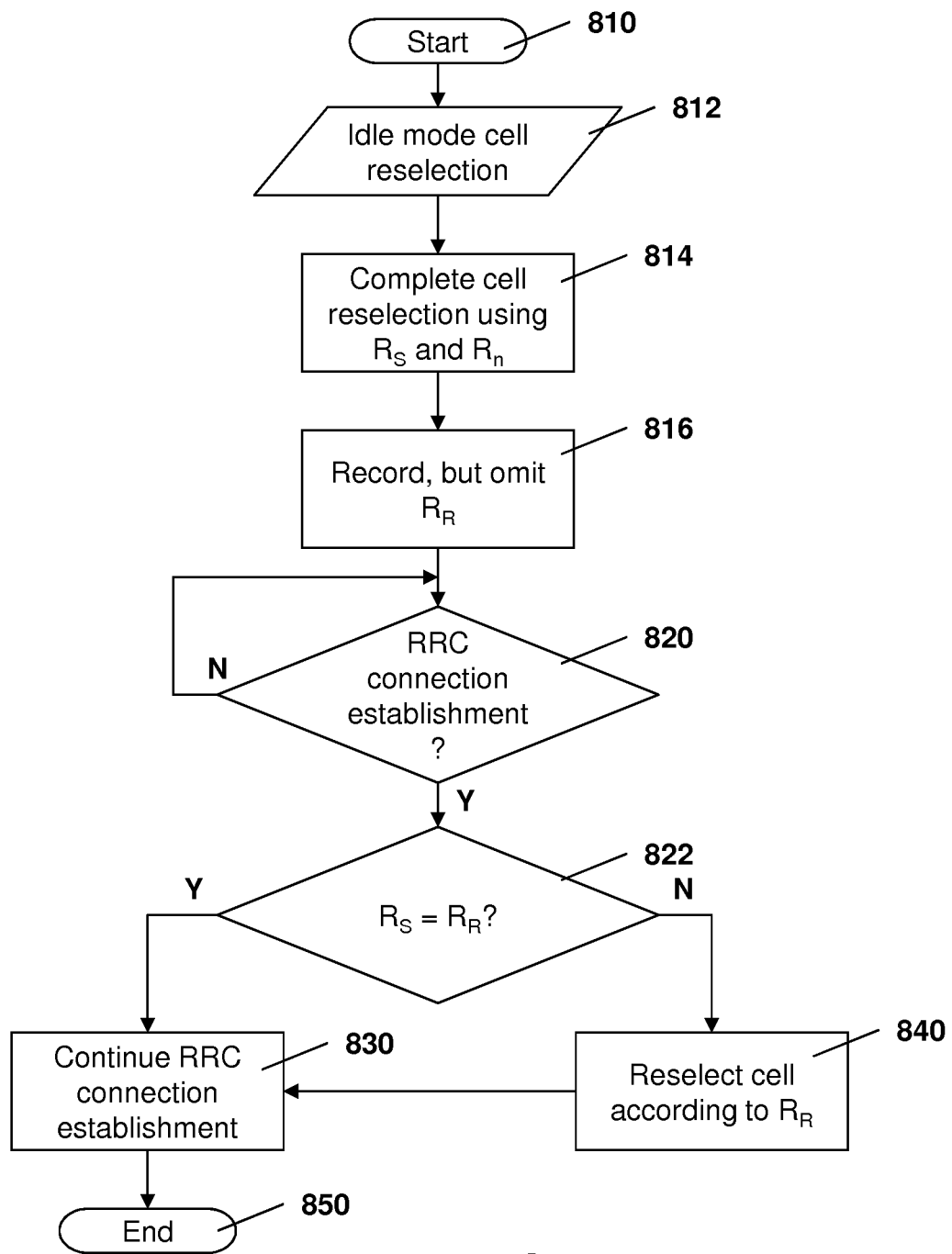
FIG. 8 is a flow diagram showing a first RRC connection establishment procedure.

In one embodiment, RRC connection establishment procedures should also reflect checking of the ranking of the serving and reestablishment cells, if different. Reference is now made to FIG. 8.

The process of FIG. 8 uses rankings for the last re-selection and/or measurements. The process starts at block 810 and proceeds to block 812, which has a precondition of an idle mode cell reselection. Thus during idle mode cell reselection the process proceeds to block 814 in which a cell reselection is completed according to ranking criterion using $R_S$ and $R_n$. The process then proceeds to block 816 and records, but omits, the highest ranking cell according to criterion $R_R$ from the idle mode reselection.

The process then proceeds to block 820 and waits for an RRC connection establishment. Once RRC connection establishment is started, the process proceeds to block 822 and checks whether the current serving cell, $R_S$, is equal to highest ranked cell according to $R_R$. If yes, then the process proceeds to block 830 in which the RRC connection establishment is continued.

Conversely, from block 822 if $R_S$ is not equal to highest ranked cell according to $R_R$, the process proceeds to block 840 and the UE reselects to cell according to $R_R$. The process then proceeds from block 840 to block 830 in which the RRC connection establishment is continued and the process then ends at block 850.

Alternatively, a procedure for using the rankings for the last reselection and/or measurements is provided, redoing reselection procedures if the ranking for the serving cell is not the same as the ranking for r-biased RRC connection establishment. In particular, reference is now made to FIG. 9.

Figure 9:
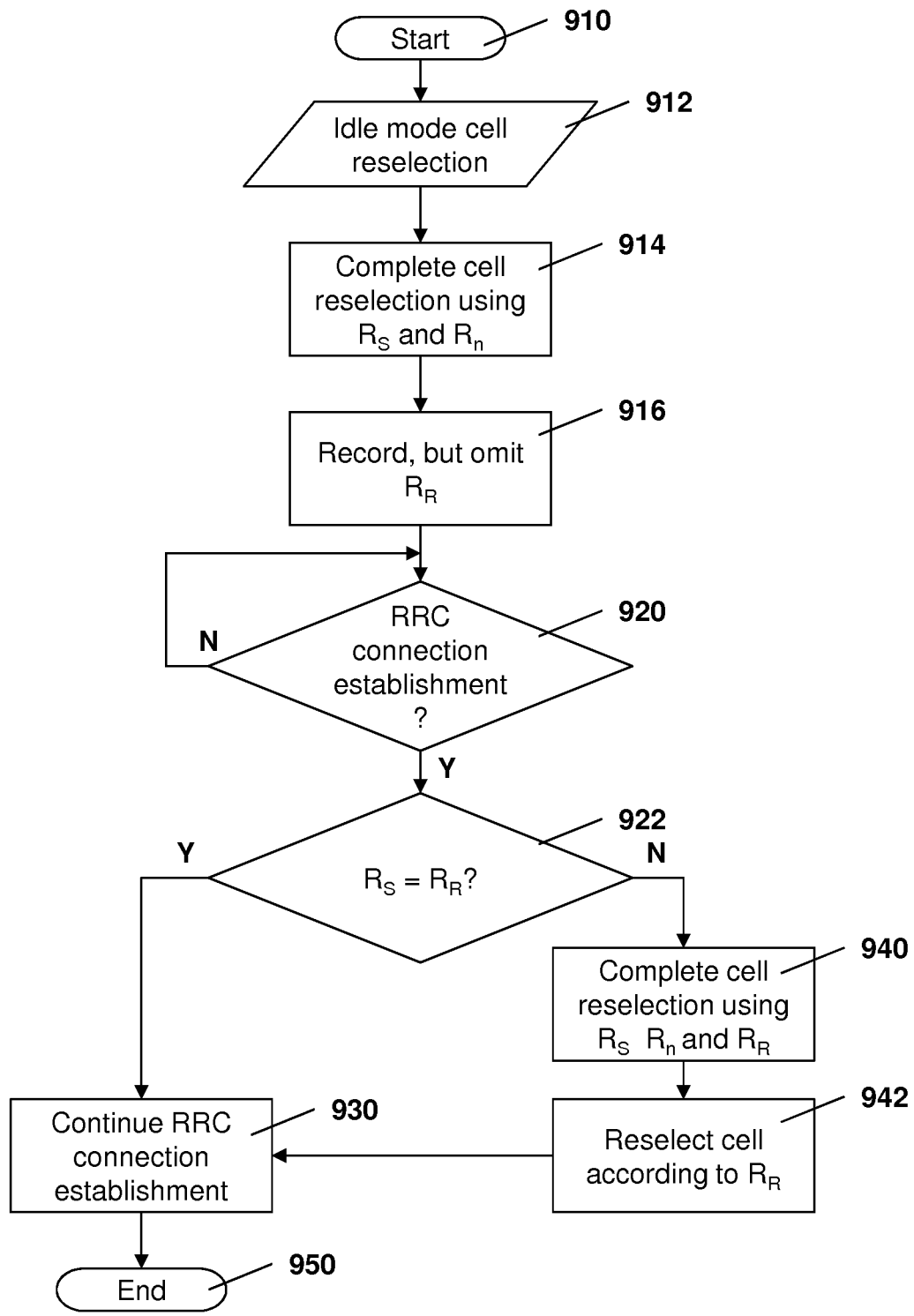
FIG. 9 is a flow diagram showing a second RRC connection establishment procedure.

The process of FIG. 9 starts at block 910 and proceeds to block 912 in which a precondition is that an idle mode cell reselection occurs.

The process then proceeds to block 914 in which a reselection is completed for the rankings and the neighbor cell rankings.

Further, the process proceeds to block 916 in which the reselection rankings for r-biased RRC connection establishment reselection are recorded but omitted from the calculation for idle mode cell connections.

The process then proceeds to block 920 and waits until an RRC connection establishment is started.

Once the RRC connection establishment is started, the process proceeds to block 922 in which a check is made to determine when the ranking for the serving cell are the same as the rankings for r-biased RRC connection reestablishment reselection. If yes, the process proceeds to block 930 and continues the RRC connection establishment.

Conversely, if the serving cell rankings are not equal to the r-biased RRC connection reestablishment reselection rankings, the process proceeds to block 940 in which the cell reselection is completed using the serving cell rankings, neighbor cell rankings and r-biased RRC connection reestablishment reselection rankings.

The process then proceeds to block 942 in which the cell according to r-biased RRC connection reestablishment reselection ranking is reselected and the process then proceeds to block 930 and continues with the RRC connection establishment procedures.

The process ends at block 950.

In a third embodiment, reselection may be undergone prior to RRC connection establishment.

Figure 10:
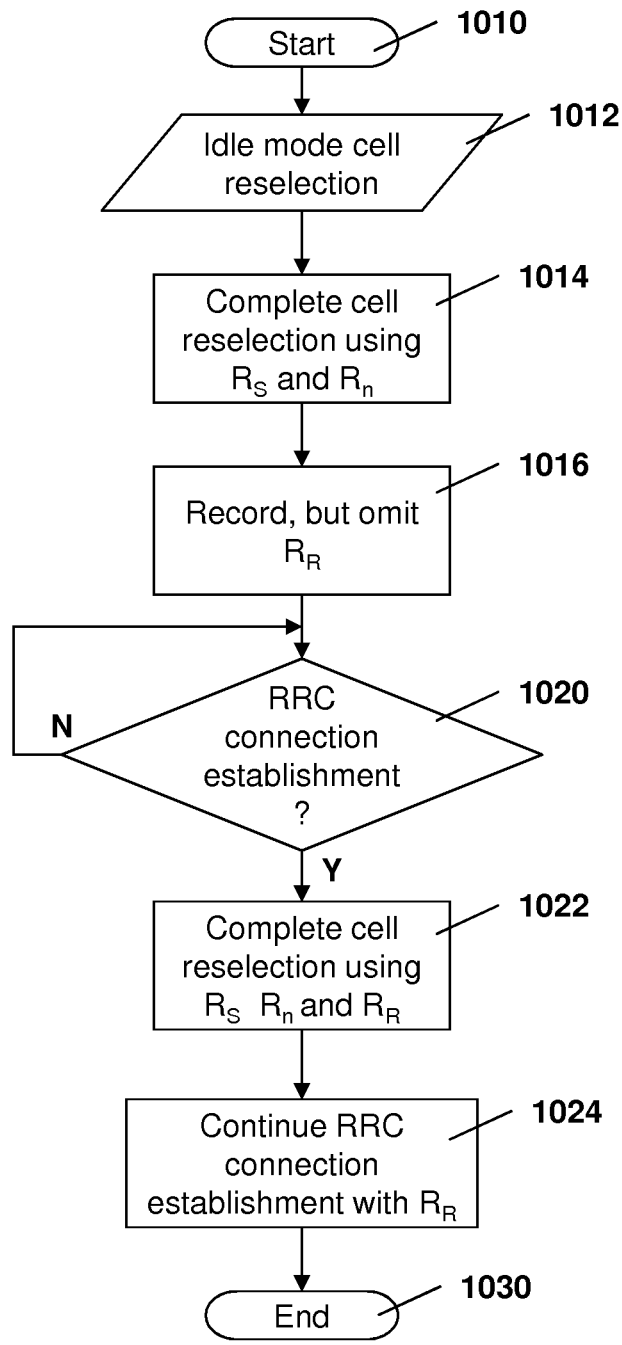
FIG. 10 is a flow diagram showing a third RRC connection establishment procedure.

Reference is now made to FIG. 10. In FIG. 10, the process starts at block 1010 and proceeds to block 1012 in which a precondition is that the idle mode reselection is occurring.

The process proceeds to block 1014 in which the cell reselection is completed using the rankings for the serving cell and neighboring cells. Further, the process proceeds to block 1016 in which the rankings for r-biased RRC connection reestablishment reselection are recorded but omitted from the idle cell reselection criteria.

The process then proceeds to block 1020, where the process waits until RRC connection establishment is started.

The process then proceeds to block 1022 in which cell reselection is completed using ranking criterion $R_S$, $R_n$ and $R_R$.

From block 922, the process proceeds to block 1024 and continues with the RRC connection establishment procedures with cell reselection according to $R_R$.

From block 1024 the proceeds to block 1030 and ends.

The process of FIG. 10 may be followed, for example, when one or more serving or neighbor cells indicates an r-Bias to be used in broadcast information. In other cases, existing procedures such as connecting to the $R_S$ may be followed.

In one embodiment, if the cell chosen for RRC connection establishment is different than that which the UE is camped upon, the UE may need to acquire information from at least the master information block, SIB1 and SIB2 prior to RRC connection establishment. The UE may acquire this information during reselection processes.

Further, in some embodiments, the UE may acquire appropriate broadcast information at the beginning of the initiation of the RRC establishment procedure. Alternatively, the UE may store information from the last reselection procedures for potential cells, and therefore may acquire only enough information to check relevant information has not changed. For example, the UE can check if a value tag of SIB1 has changed.

In other embodiments, the UE may acquire data from broadcast information of the cell on which the UE is camped. For example, if the UE is camped on a macro cell, according to the embodiment of FIG. 6 above, the aggressor cell may provide the r-Bias as well as additional information for RRC connection establishment regarding the victim cells.

In some embodiments, the combinations of operations from FIGS. 8 through 10 may be used depending on the stimulus of the RRC connection establishment request. For example, in one embodiment, the UE may proceed according the embodiment of FIG. 8. However, at the point of the initiating connection establishment 820, the UE may proceed according to the next step of FIG. 8, block 822, only if RRC connection establishment is UE initiated. If the cause for RRC connection establishment is a response to a page from the network, then the UE may immediate proceed to block 1022 of FIG. 10 and begin complete cell reselection. Completing a cell reselection may cause additional delay so it may be used only in response to a page, where as proceeding with stored rankings may be more appropriate for cases of UE initiated RRC connection establishment, in one embodiment.

In some embodiments illustrated by FIGS. 8-10, UE initiated emergency calls may not be subject to cell reselection according to $R_R$+ in blocks 822, 922, 1022, and instead may always proceed with RRC connection establishment with the serving cell.

Application to Mobility in Heterogeneous Deployments

In heterogeneous environments, when an idle mode UE is moving through a coverage region of a macro cell with many smaller embedded pico cells, the UE may suffer from frequent reselection and camping as the UE proceeds to move through the area. Each reselection and camping procedure requires measurement, processing and reception of system information from each target cell, leading to increased battery consumption at the UE.

Excessive reselection may be prevented using the above described embodiments while moving through heterogeneous coverage areas.

In one embodiment, an existing camping bias $Q_{offset}$ can be set for pico cells such that a UE moving through the coverage region will not camp on the pico cell coverage areas the UE moves through. Instead the UE remains camped on the macro cell only.

Further, the r-Bias can be such that if the UE needs to enter a connected mode, it will do so by connecting to an appropriate nearby pico cell rather than a macro cell. Hence, if the UE is paged or otherwise needs to initiate RRC connection establishment procedures, the UE can still apply the procedures as described above with reference to FIG. 5.

In an alternative embodiment, it may be desirable for a UE to camp on a pico cell rather than the macro cell. In this case, the UE camps on and receives potential paging messages from the pico cell since the pico cell has the highest power level, where the power level and camping bias are such that the UE selects the pico cell for camping. However, in the event of a page or other stimulus that causes the UE to initiate RRC connection establishment, the UE may apply the r-Bias as described above and initiate an RRC connection to the macro cell. This process may minimize the number of handovers required as the UE moves through a region of interfering pico cells.

The above may be implemented by any network element. A simplified network element is shown with regard to FIG. 11. The network element of FIG. 11 may be eNB 120, 220, 412, 512, 514, 612, 614, 712 or 714, among others.

Figure 11:
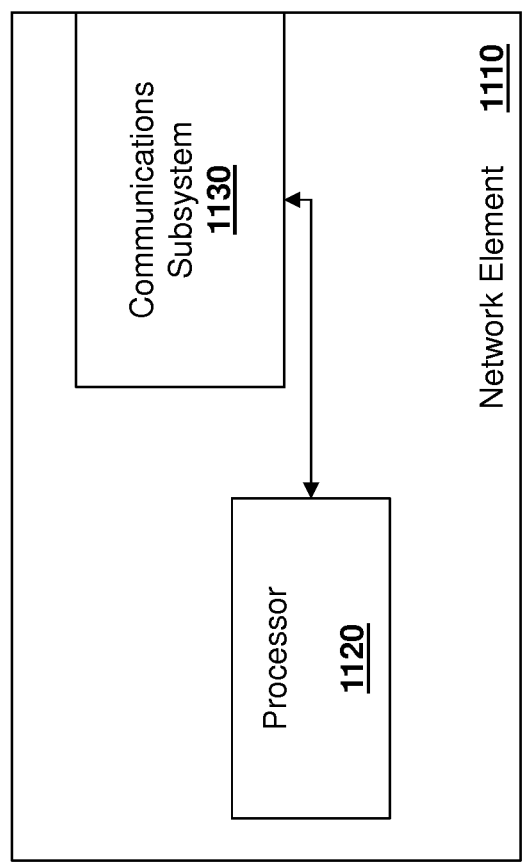
FIG. 11 is a simplified block diagram of a network element capable of being used with the embodiments of the present disclosure.

In FIG. 11, network element 1110 includes a processor 1120 and a communications subsystem 1130, where the processor 1120 and communications subsystem 1130 cooperate to perform the methods described above.

Figure 12:
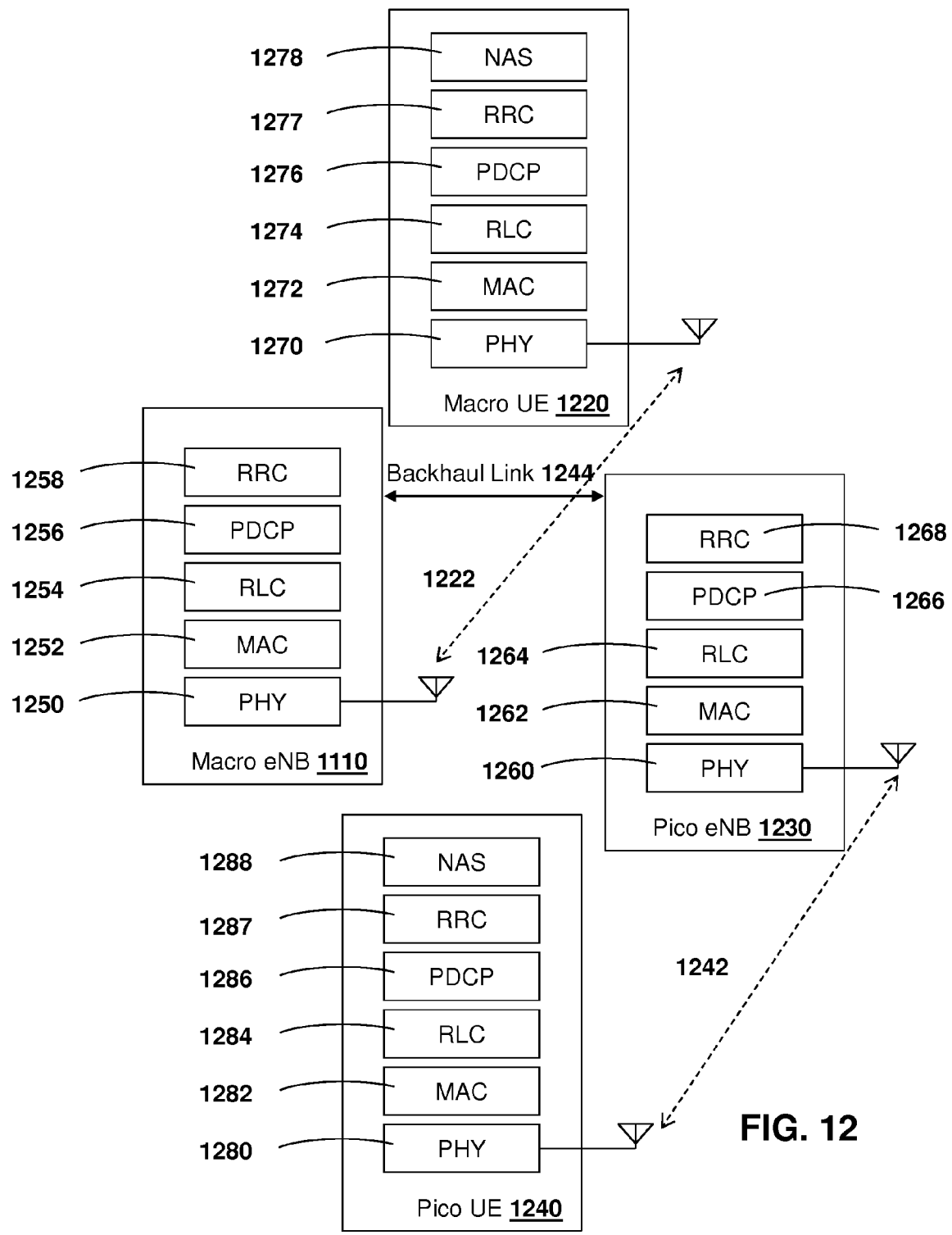
FIG. 12 is a block diagram illustrating communications between the macro eNB and UE and a pico eNB and UE.

Reference is now made to FIG. 12, which shows a simplified architecture for communication between various elements in a system. In particular, a macro eNB 1210 provides cell coverage to a macro area and may server a macro UE 1220, which communicates with the macro eNB 1210 through communication link 1222.

Similarly, a pico eNB 1230 communicates with a pico UE 1240 through a communication link, shown by arrow 1242.

In the example of FIG. 12, pico eNB 1230 is found within the area served by macro eNB 1210.

A wired or wireless backhaul link 1244 is used to provide communication and synchronization between the macro eNB 1210 and pico eNB 1230. In particular, the backhaul link 1244 may be used to synchronize the ABS subframes for macro eNB 1210.

As shown in the example of FIG. 12, each element includes a protocol stack for the communications with other elements. In the case of macro eNB 1210 the macro eNB includes a physical layer 1250, a medium access control (MAC) layer

1252, a radio link control (RLC) layer 1254, a packet data convergence protocol (PDCP) layer 1256 and a radio resource control (RRC) layer 1258.

Similarly, the pico eNB includes the physical layer 1260, MAC layer 1262, RLC layer 1264, PDCP layer 1266 and RRC layer 1268.

In the case of macro UE 1220, the macro UE includes a physical layer 1270, a MAC layer 1272, an RLC layer 1274, a PDCP layer 1276, an RRC layer 1277 and a non-access stratum (NAS) layer 1278.

Similarly, the pico UE 1240 includes the physical layer 1280, the MAC layer 1282, the RLC layer 1284, the PDCP layer 1286, the RRC layer 1287 and the NAS layer 1288.

Communications between the entities, such as between macro eNB 1210 and macro UE 1220, generally occur within the same protocol layer between the two entities. Thus, for example, communications from the RRC layer at macro eNB 1210 travels through the PDCP layer, RLC layer, MAC layer and physical layer and gets sent over the physical layer to macro UE 1220. When received at macro UE 1220, the communications travel through the physical layer, MAC layer, RLC layer, PDCP layer to the RRC level of macro UE 1220. Such communications are generally done utilizing a communications sub-system and a processor.

Further, the above may be implemented by any UE. One exemplary device is described below with regard to FIG. 13.

UE 1300 is typically a two-way wireless communication device having voice and data communication capabilities. UE 1300 generally has the capability to communicate with other computer systems on the Internet. Depending on the exact functionality provided, the UE may be referred to as a data messaging device, a two-way pager, a wireless e-mail device, a cellular telephone with data messaging capabilities, a wireless Internet appliance, a wireless device, a mobile device, or a data communication device, as examples.

Where UE 1300 is enabled for two-way communication, it may incorporate a communication subsystem 1311, including both a receiver 1312 and a transmitter 1314, as well as associated components such as one or more antenna elements 1316 and 1318, local oscillators (LOs) 1313, and a processing module such as a digital signal processor (DSP) 1320. As will be apparent to those skilled in the field of communications, the particular design of the communication subsystem 1311 will be dependent upon the communication network in which the device is intended to operate. The radio frequency front end of communication subsystem 1311 can be any of the embodiments described above.

Network access requirements will also vary depending upon the type of network 1319. In some networks network access is associated with a subscriber or user of UE 1300. A UE may require a removable user identity module (RUIM) or a subscriber identity module (SIM) card in order to operate on a CDMA network. The SIM/RUIM interface 1344 is normally similar to a card-slot into which a SIM/RUIM card can be inserted and ejected. The SIM/RUIM card can have memory and hold many key configurations 1351, and other information 1353 such as identification, and subscriber related information.

Figure 13:
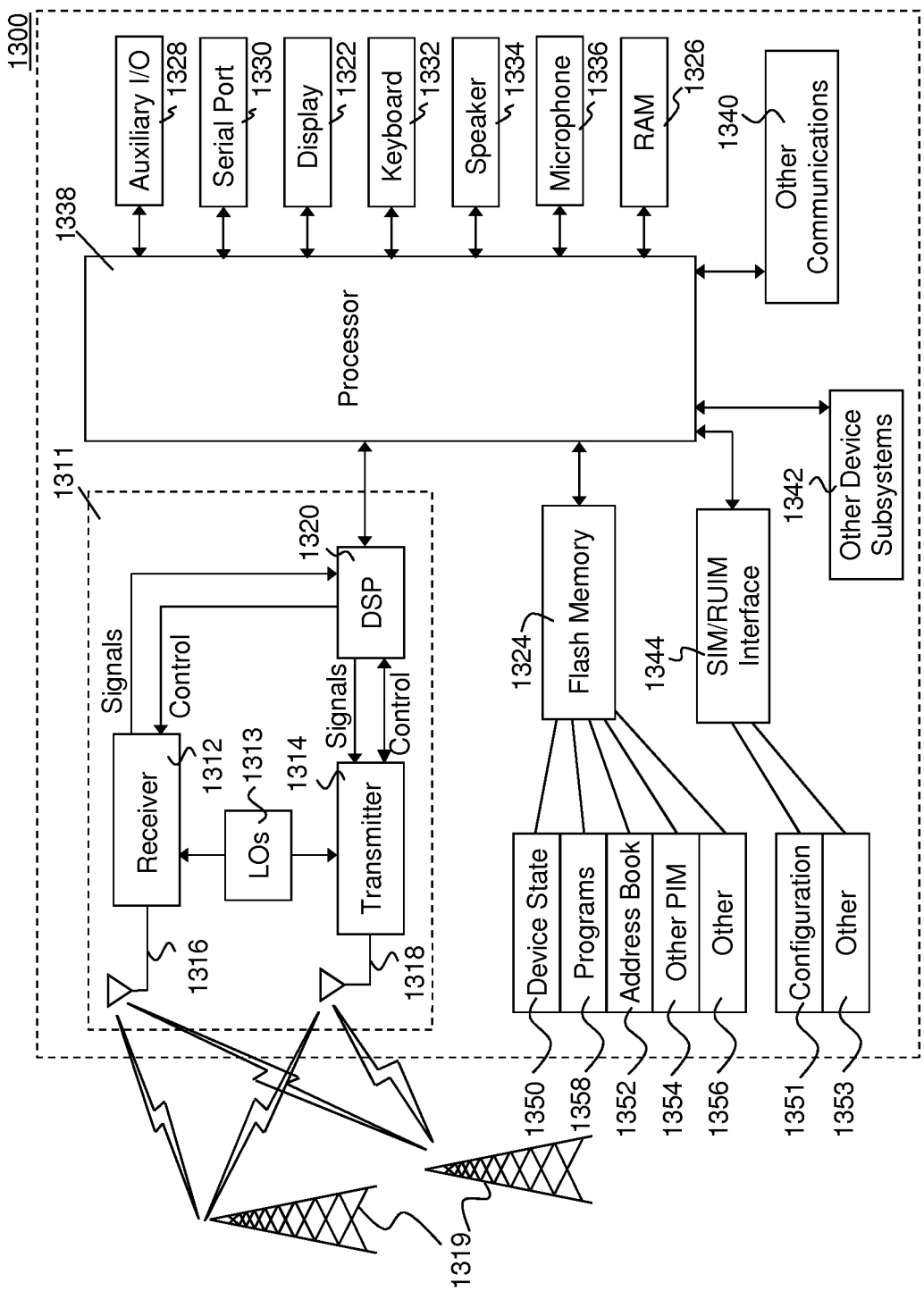
FIG. 13 is a block diagram of an example mobile device.

When required network registration or activation procedures have been completed, UE 1300 may send and receive communication signals over the network 1319. As illustrated in FIG. 13, network 1319 can consist of multiple base stations communicating with the UE.

Signals received by antenna 1316 through communication network 1319 are input to receiver 1312, which may perform such common receiver functions as signal amplification, frequency down conversion, filtering, channel selection and the like. A/D conversion of a received signal allows more complex communication functions such as demodulation and decoding to be performed in the DSP 1320. In a similar manner, signals to be transmitted are processed, including modulation and encoding for example, by DSP 1320 and input to transmitter 1314 for digital to analog conversion, frequency up conversion, filtering, amplification and transmission over the communication network 1319 via antenna 1318. DSP 1320 not only processes communication signals, but also provides for receiver and transmitter control. For example, the gains applied to communication signals in receiver 1312 and transmitter 1314 may be adaptively controlled through automatic gain control algorithms implemented in DSP 1320.

UE 1300 generally includes a processor 1338 which controls the overall operation of the device. Communication functions, including data and voice communications, are performed through communication subsystem 1311. Processor 1338 also interacts with further device subsystems such as the display 1322, flash memory 1324, random access memory (RAM) 1326, auxiliary input/output (I/O) subsystems 1328, serial port 1330, one or more keyboards or keypads 1332, speaker 1334, microphone 1336, other communication subsystem 1340 such as a short-range communications subsystem and any other device subsystems generally designated as 1342. Serial port 1330 could include a USB port or other port known to those in the art.

Some of the subsystems shown in FIG. 13 perform communication-related functions, whereas other subsystems may provide "resident" or on-device functions. Notably, some subsystems, such as keyboard 1332 and display 1322, for example, may be used for both communication-related functions, such as entering a text message for transmission over a communication network, and device-resident functions such as a calculator or task list.

Operating system software used by the processor 1338 may be stored in a persistent store such as flash memory 1324, which may instead be a read-only memory (ROM) or similar storage element (not shown). Those skilled in the art will appreciate that the operating system, specific device applications, or parts thereof, may be temporarily loaded into a volatile memory such as RAM 1326. Received communication signals may also be stored in RAM 1326.

As shown, flash memory 1324 can be segregated into different areas for both computer programs 1358 and program data storage 1350, 1352, 1354 and 1356. These different storage types indicate that each program can allocate a portion of flash memory 1324 for their own data storage requirements. Processor 1338, in addition to its operating system functions, may enable execution of software applications on the UE. A predetermined set of applications that control basic operations, including at least data and voice communication applications for example, will normally be installed on UE 1300 during manufacturing. Other applications could be installed subsequently or dynamically.

Applications and software may be stored on any computer readable storage medium. The computer readable storage medium may be a tangible or in transitory/non-transitory medium such as optical (e.g., CD, DVD, etc.), magnetic (e.g., tape) or other memory known in the art.

One software application may be a personal information manager (PIM) application having the ability to organize and manage data items relating to the user of the UE such as, but not limited to, e-mail, calendar events, voice mails, appointments, and task items. Naturally, one or more memory stores would be available on the UE to facilitate storage of PIM data items. Such PIM application may have the ability to send and receive data items, via the wireless network 1319. Further applications may also be loaded onto the UE 1300 through the network 1319, an auxiliary I/O subsystem 1328, serial port 1330, short-range communications subsystem 1340 or any other suitable subsystem 1342, and installed by a user in the RAM 1326 or a non-volatile store (not shown) for execution by the processor 1338. Such flexibility in application installation increases the functionality of the device and may provide enhanced on-device functions, communication-related functions, or both. For example, secure communication applications may enable electronic commerce functions and other such financial transactions to be performed using the UE 1300.

In a data communication mode, a received signal such as a text message or web page download will be processed by the communication subsystem 1311 and input to the processor 1338, which may further process the received signal for output to the display 1322, or alternatively to an auxiliary I/O device 1328.

A user of UE 1300 may also compose data items such as email messages for example, using the keyboard 1332, which may be a complete alphanumeric keyboard or telephone-type keypad, among others, in conjunction with the display 1322 and possibly an auxiliary I/O device 1328. Such composed items may then be transmitted over a communication network through the communication subsystem 1311.

For voice communications, overall operation of UE 1300 is similar, except that received signals would typically be output to a speaker 1334 and signals for transmission would be generated by a microphone 1336. Alternative voice or audio I/O subsystems, such as a voice message recording subsystem, may also be implemented on UE 1300. Although voice or audio signal output is preferably accomplished primarily through the speaker 1334, display 1322 may also be used to provide an indication of the identity of a calling party, the duration of a voice call, or other voice call related information for example.

Serial port 1330 in FIG. 13 would normally be implemented in a personal digital assistant (PDA)-type UE for which synchronization with a user's desktop computer (not shown) may be desirable, but is an optional device component. Such a port 1330 would enable a user to set preferences through an external device or software application and would extend the capabilities of UE 1300 by providing for information or software downloads to UE 1300 other than through a wireless communication network. The alternate download path may for example be used to load an encryption key onto the device through a direct and thus reliable and trusted connection to thereby enable secure device communication. As will be appreciated by those skilled in the art, serial port 1230 can further be used to connect the UE to a computer to act as a modem.

Other communications subsystems 1340, such as a short-range communications subsystem, is a further optional component which may provide for communication between UE 1300 and different systems or devices, which need not necessarily be similar devices. For example, the subsystem 1340 may include an infrared device and associated circuits and components or a Bluetooth™ communication module to provide for communication with similarly enabled systems and devices. Subsystem 1340 may further include non-cellular communications such as WiFi or WiMAX.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

APPENDIX A

RadioResourceConfigCommon information element

```
-- ASN1START
RadioResourceConfigCommonSIB ::= SEQUENCE {
    rach-ConfigCommon                   RACH-ConfigCommon,
    bcch-Config                         BCCH-Config,
    pcch-Config                         PCCH-Config,
    prach-Config                        PRACH-ConfigSIB,
    pdsch-ConfigCommon                      PDSCH-ConfigCommon,
    pusch-ConfigCommon                      PUSCH-ConfigCommon,
    pucch-ConfigCommon                      PUCCH-ConfigCommon,
    soundingRS-UL-ConfigCommon                  SoundingRS-UL-ConfigCommon,
    uplinkPowerControlCommon            UplinkPowerControlCommon,
    ul-CyclicPrefixLength               UL-CyclicPrefixLength,
    ...,
    [[  uplinkPowerControlCommon-v1020          UplinkPowerControlCommon-v1020
    OPTIONAL -- Need OR
    ]]
}
RadioResourceConfigCommon ::=           SEQUENCE {
    rach-ConfigCommon                       RACH-ConfigCommon           OPTIONAL, --
Need ON
    prach-Config                        PRACH-Config,
    pdsch-ConfigCommon                      PDSCH-ConfigCommon
    OPTIONAL, -- Need ON
    pusch-ConfigCommon                      PUSCH-ConfigCommon,
    phich-Config                        PHICH-Config                OPTIONAL, --
Need ON
    pucch-ConfigCommon                      PUCCH-ConfigCommon
    OPTIONAL, -- Need ON
    soundingRS-UL-ConfigCommon              SoundingRS-UL-ConfigCommon
    OPTIONAL, -- Need ON
```

APPENDIX A-continued

| RadioResourceConfigCommon information element |
|---|

```
        uplinkPowerControlCommon                       UplinkPowerControlCommon
OPTIONAL, -- Need ON
        antennaInfoCommon                              AntennaInfoCommon      OPTIONAL, --
Need ON
        p-Max                                          P-Max
OPTIONAL, -- Need OP
        r-Bias                                         R-Bias
OPTIONAL, -- Need OP
        tdd-Config                                     TDD-Config
OPTIONAL, -- Cond TDD
        ul-CyclicPrefixLength                          UL-CyclicPrefixLength,
        ...,
        [[ uplinkPowerControlCommon-v1020              UplinkPowerControlCommon-v1020
OPTIONAL -- Need ON
        ]]
}
RadioResourceConfigCommonSCell-r10 ::=             SEQUENCE {
    -- DL configuration as well as configuration applicable for DL and UL
    nonUL-Configuration-r10                        SEQUENCE {
        -- 1: Cell characteristics
        dl-Bandwidth-r10                           ENUMERATED {n6, n15, n25, n50, n75,
n100},
        -- 2: Physical configuration, general
        antennaInfoCommon-r10                          AntennaInfoCommon,
        mbsfn-SubframeConfigList-r10                   MBSFN-SubframeConfigList
OPTIONAL, -- Need OR
        -- 3: Physical configuration, control
        phich-Config-r10                               PHICH-Config,
        -- 4: Physical configuration, physical channels
        pdsch-ConfigCommon-r10                         PDSCH-ConfigCommon,
        tdd-Config-r10                                 TDD-Config            OPTIONAL
    },
    -- UL configuration
    ul-Configuration-r10                           SEQUENCE {
        ul-FreqInfo-r10                            SEQUENCE {
            ul-CarrierFreq-r10                         ARFCN-ValueEUTRA
OPTIONAL, -- Need OP
            ul-Bandwidth-r10                           ENUMERATED {n6, n15,
                                                       n25, n50, n75, n100} OPTIONAL, --
Need OP
            additionalSpectrumEmissionSCell-r10        AdditionalSpectrumEmission
        },
        p-Max-r10                                      P-Max                 OPTIONAL, --
Need OP
        uplinkPowerControlCommonSCell-r10              UplinkPowerControlCommonSCell-r10,
        -- A special version of IE UplinkPowerControlCommon may be introduced
        -- 3: Physical configuration, control
        soundingRS-UL-ConfigCommon-r10                 SoundingRS-UL-ConfigCommon,
        ul-CyclicPrefixLength-r10                  UL-CyclicPrefixLength,
        -- 4: Physical configuration, physical channels
        prach-ConfigSCell-r10                          PRACH-ConfigSCell-r10
OPTIONAL, -- Cond TDD-OR
        pusch-ConfigCommon-r10                         PUSCH-ConfigCommon
    }                                                                        OPTIONAL, --
Need OR
    ...
}
BCCH-Config ::=                                    SEQUENCE {
    modificationPeriodCoeff                            ENUMERATED {n2, n4, n8, n16}
}
PCCH-Config ::=                                    SEQUENCE {
    defaultPagingCycle                                 ENUMERATED {
                                                       rf32, rf64, rf128, rf256},
    nB                                                 ENUMERATED {
                                                       fourT, twoT, oneT, halfT, quarterT,
oneEighthT,
                                                       oneSixteenthT, oneThirtySecondT}
}
UL-CyclicPrefixLength ::=                          ENUMERATED {len1, len2}
R-Bias ::=                                         integer (-maxRBias .. maxRBias)
-- ASN1STOP
```

APPENDIX B

RadioResourceConfigCommon field descriptions additionalSpectrumEmissionSCell
The UE requirements related to IE AdditionalSpectrumEmissionSCell are defined in TS 36.101 [42].
defaultPagingCycle
Default paging cycle, used to derive 'T' in TS 36.304 [4]. Value rf32 corresponds to 32 radio frames, rf64 corresponds to 64 radio frames and so on.
modificationPeriodCoeff
Actual modification period, expressed in number of radio frames = modificationPeriodCoeff * defaultPagingCycle. n2 corresponds to value 2, n4 corresponds to value 4, n8 corresponds to value 8 and n16 corresponds to value 16.
nB
Parameter: nB is used as one of parameters to derive the Paging Frame and Paging Occasion according to TS 36.304 [4]. Value in multiples of 'T' as defined in TS 36.304 [4]. A value of fourT corresponds to 4 * T, a value of twoT corresponds to 2 * T and so on.
p-Max
Pmax to be used in the target cell. If absent the UE applies the maximum power according to the UE capability.
r-Bias

APPENDIX B-continued

RadioResourceConfigCommon field descriptions

RBias to be applied to power measurements of this cell during cell reselection. If absent the UE applies zero bias.
ul-Bandwidth
Parameter: transmission bandwidth configuration, $N_{RB}$, in uplink, see TS 36.101 [42, table 5.6-1]. Value n6 corresponds to 6 resource blocks, n15 to 15 resource blocks and so on. If for FDD this parameter is absent, the uplink bandwidth is equal to the downlink bandwidth. For TDD this parameter is absent and it is equal to the downlink bandwidth.
ul-CarrierFreq
For FDD: If absent, the (default) value determined from the default TX-RX frequency separation defined in TS 36.101 [42, table 5.7.3-1] applies.
For TDD: This parameter is absent and it is equal to the downlink frequency.
UL-CyclicPrefixLength
Parameter: Uplink cyclic prefix length see 36.211 [21, 5.2.1] where len1 corresponds to normal cyclic prefix and len2 corresponds to extended cyclic prefix.

APPENDIX C

SystemInformationBlockType4 information element (per cell r-Bias)

```
-- ASN1START

SystemInformationBlockType4 ::=      SEQUENCE { intraFreqNeighCellList           IntraFreqNeighCellList         OPTIONAL, --
Need OR intraFreqBlackCellList           IntraFreqBlackCellList OPTIONAL, -- Need OR csg-PhysCellId Range             PhysCellIdRange OPTIONAL, -- Cond CSG
    ...,
    lateNonCriticalExtension         OCTET STRING                   OPTIONAL  --
Need OP
}
IntraFreqNeighCellList ::=           SEQUENCE (SIZE (1..maxCellIntra)) OF
IntraFreqNeighCellInfo
IntraFreqNeighCellInfo ::=           SEQUENCE {
    physCellId                           PhysCellId,
    q-OffsetCell                         Q-OffsetRange,
    r-Bias                               R-Bias
    OPTIONAL, -- Need OP
    ...
}
IntraFreqBlackCellList ::=           SEQUENCE (SIZE (1..maxCellBlack)) OF PhysCellIdRange
R-Bias ::= (-maxRBias .. maxRBias)
-- ASN1STOP
```

APPENDIX D

SystemInformationBlockType4 field descriptions csg-PhysCellIdRange
Set of physical cell identities reserved for CSG cells on the frequency on which this field was received. The received csg-PhysCellIdRange applies if less than 24 hours has elapsed since it was received and it was received in the same primary PLMN. The 3 hour validity restriction (section 5.2.1.3) does not apply to this field.
intraFreqBlackCellList
List of blacklisted intra-frequency ing cells.
intraFreqNeighbCellList
List of intra-frequency neighbouring cells with specific cell re-selection parameters.
q-OffsetCell
Parameter "Qoffset$_{s, n}$" in TS 36.304 [4].
r-Bias
RBias to be applied to power measurements of the neighbour cell during cell reselection. If absent the UE applies zero bias.

| Conditional presence | Explanation |
|---|---|
| CSG | This field is optional, need OP, for non-CSG cells, and mandatory for CSG cells. |

APPENDIX E

SystemInformationBlockType4 information element (single r-Bias value)

```
-- ASN1START
SystemInformationBlockType4 ::=      SEQUENCE {
    intraFreqNeighCellList           IntraFreqNeighCellList       OPTIONAL, -- Need OR
    intraFreqBlackCellList           IntraFreqBlackCellList       OPTIONAL, -- Need OR
    csg-PhysCellIdRange              PhysCellIdRange              OPTIONAL, -- Cond CSG
    ...,
    lateNonCriticalExtension         OCTET STRING                 OPTIONAL   -- Need OP
    r-Bias                           R-Bias                       OPTIONAL, -- Need OP
}
IntraFreqNeighCellList ::=           SEQUENCE (SIZE (1..maxCellIntra)) OF
IntraFreqNeighCellInfo
IntraFreqNeighCellInfo ::=           SEQUENCE {
    physCellId                           PhysCellId,
    q-OffsetCell                         Q-OffsetRange,
    ...
}
IntraFreqBlackCellList ::=           SEQUENCE (SIZE (1..maxCellBlack)) OF PhysCellIdRange
R-Bias ::= (-maxRBias .. maxRBias)
-- ASN1STOP
```

APPENDIX F

SystemInformationBlockType4 field descriptions csg-PhysCellIdRange
Set of physical cell identities reserved for CSG cells on the frequency on which this field was received. The received csg-PhysCellIdRange applies if less than 24 hours has elapsed since it was received and it was received in the same primary PLMN. The 3 hour validity restriction (section 5.2.1.3) does not apply to this field.
intraFreqBlackCellList
List of blacklisted intra-frequency ing cells.
intraFreqNeighbCellList
List of intra-frequency neighbouring cells with specific cell re-selection parameters.
q-OffsetCell
Parameter "Qoffset$_{s, n}$" in TS 36.304 [4].
r-Bias
RBias to be applied to power measurements of the neighbour cells during cell reselection. If absent the UE applies zero bias.

| Conditional presence | Explanation |
|---|---|
| CSG | This field is optional, need OP, for non-CSG cells, and mandatory for CSG cells. |

APPENDIX G

5.2.4.X Intra-frequency and equal priority inter-frequency Cell Reselection criteria with reselection bias The cell-ranking criterion $R_s$ for serving cell and $R_n$ for neighboring cells is defined by:
$R_s = Q_{meas, s} + Q_{Hyst}$
$R_n = Q_{meas, n} - Qoffset$
$R_R = Q_{meas, n} - \text{r-Bias}$ where:
| | |
|---|---|
| $Q_{meas}$ | RSRP measurement quantity used in cell reselections. |
| Qoffset | For intra-frequency: Equals to Qoffset$_{s, n}$, if Qoffset$_{s, n}$ is valid, otherwise this equals to zero.<br>For inter-frequency: Equals to Qoffset$_{s, n}$ plus Qoffset$_{frequency}$, if Qoffset$_{s, n}$ is valid, otherwise this equals to Qoffset$_{frequency}$. |
| r-Bias | RRC connection establishment bias. Equals r-bias$_{s, n}$ if r-bias$_{s, n}$ is valid, otherwise equals zero. |

The invention claimed is:

1. A method comprising:

receiving, at a user equipment, a connection establishment bias;

applying the connection establishment bias at the user equipment to at least one network node power level value, thereby creating biased power level values;

if the user equipment is establishing connected mode, selecting, a first network node based on the biased power level values;

if the user equipment is entering idle mode, selecting the first network node without regard to the biased power level values; and connecting to the first network node.

2. The method of claim 1, wherein the user equipment is camped on a second network node while in idle mode.

3. The method of claim 2, further comprising determining that the connected mode needs to be established, wherein the determining is based on a received page from the second network node.

4. The method of claim 1, wherein the receiving is from the first network node.

5. The method of claim 1, wherein the receiving provides a single bias value to be applied to a second network node distinct from the first network node.

6. The method of claim 1, wherein the receiving provides a single bias value to be applied to the first network node.

7. The method of claim 1, wherein the receiving provides a first bias value for the first network node and a second bias value for a second network node.

8. The method of claim 1, wherein the receiving is from a second network node distinct from the first network node.

9. The method of claim 1, wherein the connection establishment bias is received as part of a Long Term Evolution System Information Block.

10. The method of claim 1, wherein the connection establishment bias is received as part of a Long Term Evolution System Information Block 4 Information Element.

11. The method of claim 1, further comprising selecting a network node based upon a biased power level value ranking for each network node.

12. The method of claim 1, further comprising determining that the connected mode needs to be established, wherein the determining is based on the buffering of uplink traffic at the user equipment.

13. The method of claim 1, further comprising:

determining that a connected mode needs to be established for an emergency call; and setting the connection establishment bias to zero for the emergency call.

14. The method of claim 2, wherein the first network node is a victim network node, and the second network node is an aggressor node.

15. The method of claim 2, wherein the first network node is an aggressor network node, and the second network node is a victim node.

16. A user equipment comprising:
a processor; and
a communications subsystem,
wherein the processor and communications subsystem are configured to:
receive a connection establishment bias;
apply the connection establishment bias at the user equipment, to at least one network node power level value, thereby creating biased power level values;
if the user equipment is establishing connected mode, select a first network node based on the biased power level values;
if the user equipment is entering, idle mode, select the first network node without regard to the biased power level values; and
connect to the first network node.

17. The user equipment of claim 16, wherein the user equipment is camped on a second network node while in idle mode.

18. The user equipment of claim 17, wherein the processor and communications subsystem are further configured to determine that the connected mode needs to be established, the determining being based on a received page from the second network element.

19. The user equipment of claim 16, wherein the receiving is from the first network node.

20. The user equipment of claim 16, wherein the receiving provides a single bias value to be applied to a second network node distinct from the first network node.

21. The user equipment of claim 16, wherein the receiving provides a single bias value to be applied to the first network node.

22. The user equipment of claim 16, wherein the receiving provides a first bias value for the first network node and a second bias value for a second network node.

23. The user equipment of claim 16, wherein the receiving is from a second network node.

24. The user equipment of claim 16, wherein the connection establishment bias is received as part of a Long Term Evolution System Information Block.

25. The user equipment of claim 24, wherein the connection establishment bias is received as part of a Long Term Evolution System Information Block 4 Information Element.

26. The user equipment of claim 16, wherein the processor and communications subsystem are further configured to select a network node based upon a biased power level value ranking for each network node.

27. The user equipment of claim 16, wherein the processor and communications subsystem are further configured to determine that the connected mode needs to be established, the determining being based on the buffering of uplink traffic at the user equipment.

28. The user equipment of claim 16, wherein the processor and communications subsystem are further configured to;
determine that a connected mode needs to be established for an emergency call; and
set the connection establishment bias to zero for the emergency call.

29. The user equipment of claim 17, wherein the network first node is a victim network node, and the second network node is an aggressor node.

30. The user equipment of claim 17, wherein the first network node is an aggressor network node, and the second network node is a victim node.

* * * * *

UNITED STATES PATENT AND TRADEMARK OFFICE
CERTIFICATE OF CORRECTION

PATENT NO. : 8,934,456 B2
APPLICATION NO. : 13/475539
DATED : January 13, 2015
INVENTOR(S) : Robert Novak et al.

It is certified that error appears in the above-identified patent and that said Letters Patent is hereby corrected as shown below:

Title Page, item (75), replace inventor "Tank Tabet" with "Tarik Tabet"

Signed and Sealed this
Twelfth Day of May, 2015

Michelle K. Lee
*Director of the United States Patent and Trademark Office*